(12) United States Patent
Vreeland et al.

(10) Patent No.: US 9,787,495 B2
(45) Date of Patent: *Oct. 10, 2017

(54) SIGNALING BETWEEN MASTER AND SLAVE COMPONENTS USING A SHARED COMMUNICATION NODE OF THE MASTER COMPONENT

(71) Applicant: Allegro MicroSystems, LLC, Worcester, MA (US)

(72) Inventors: Richard Vreeland, Litchfield, NH (US); Nevenka Kozomora, Manchester, NH (US); Michael C. Doogue, Bedford, NH (US); Ricardo Scheinkerman, Ciudad Autonoma de Buenos Aires (AR)

(73) Assignee: Allegro Microsystems, LLC, Worcester, MA (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/645,957

(22) Filed: Mar. 12, 2015

(65) Prior Publication Data

US 2015/0236869 A1 Aug. 20, 2015

Related U.S. Application Data

(63) Continuation-in-part of application No. 14/182,595, filed on Feb. 18, 2014, now Pat. No. 9,172,565.

(51) Int. Cl.
*H04L 12/28* (2006.01)
*H04L 12/403* (2006.01)
*H04L 29/08* (2006.01)

(52) U.S. Cl.
CPC ........ *H04L 12/403* (2013.01); *H04L 67/125* (2013.01)

(58) Field of Classification Search
CPC ...................................................... H04L 41/12
(Continued)

(56) References Cited

U.S. PATENT DOCUMENTS

| 3,074,636 A | 1/1963 | Baker et al. |
| 4,149,144 A | 4/1979 | Diefenderfer |

(Continued)

FOREIGN PATENT DOCUMENTS

| DE | 100 30 358 A1 | 6/2000 |
| DE | 102 03 483 A1 | 5/2001 |

(Continued)

OTHER PUBLICATIONS

U.S. Appl. No. 14/506,024, filed Oct. 3, 2014, Petrie et al.
(Continued)

*Primary Examiner* — Christopher R Crompton
(74) *Attorney, Agent, or Firm* — Daly, Crowley, Mofford & Durkee, LLP

(57) ABSTRACT

A network slave device includes a transceiver for communicating over a communication bus in accordance with a point-to-point network protocol. The network slave device may include an address to identify the network slave device on the network. It may also include a communication circuit configured to process a command received by the transceiver and generate a reply for transmission over the communication bus if an address included in the command matches the address of the slave device. A master device communicating on the network may send commands including the address of the slave device in accordance with the point-to-point network protocol. In an embodiment, the point-to-point protocol is the SENT protocol.

34 Claims, 18 Drawing Sheets

(58) Field of Classification Search
USPC .......................................................... 370/254
See application file for complete search history.

(56) References Cited

U.S. PATENT DOCUMENTS

| | | |
|---|---|---|
| 4,907,223 A | 3/1990 | Wroblewski |
| 5,335,186 A | 8/1994 | Tarrant |
| 5,361,260 A | 11/1994 | Mito |
| 5,574,849 A | 11/1996 | Sonnier et al. |
| 5,606,717 A | 2/1997 | Farmwald et al. |
| 5,646,609 A | 7/1997 | O'Brien |
| 5,675,811 A | 10/1997 | Broedner et al. |
| 5,689,689 A | 11/1997 | Meyers et al. |
| 5,860,022 A | 1/1999 | Kondou et al. |
| 6,014,137 A | 1/2000 | Burns |
| 6,112,275 A | 8/2000 | Curry et al. |
| 6,118,186 A | 9/2000 | Scott et al. |
| 6,233,534 B1 | 5/2001 | Morozumi et al. |
| 6,288,567 B1 | 9/2001 | Fink |
| 6,292,494 B1 | 9/2001 | Baker et al. |
| 6,345,220 B1 | 2/2002 | Ikegami |
| 6,426,916 B2 | 7/2002 | Farmwald et al. |
| 6,522,944 B2 | 2/2003 | Wielebski et al. |
| 6,542,847 B1 | 4/2003 | Lohberg et al. |
| 6,563,419 B1 | 5/2003 | Herz et al. |
| 6,618,628 B1 | 9/2003 | Davlin et al. |
| 6,687,644 B1 | 2/2004 | Zinke et al. |
| 6,701,214 B1 | 3/2004 | Wielebski et al. |
| 6,715,020 B2 | 3/2004 | Farmwald et al. |
| 6,728,819 B2 | 4/2004 | Farmwald et al. |
| 6,751,696 B2 | 6/2004 | Farmwald et al. |
| 6,772,254 B2 | 8/2004 | Hofmann et al. |
| 6,825,625 B1 | 11/2004 | Karwath et al. |
| 6,838,999 B1 | 1/2005 | Ropke |
| 6,952,618 B2 | 10/2005 | Davlin et al. |
| 6,968,484 B2 | 11/2005 | Hummel |
| 6,975,558 B2 | 12/2005 | Farmwald et al. |
| 7,038,412 B2 | 5/2006 | Karwath et al. |
| 7,110,322 B2 | 9/2006 | Farmwald et al. |
| 7,158,900 B2 | 1/2007 | McNutt |
| 7,191,269 B2 | 3/2007 | Cluff |
| 7,207,014 B2 | 4/2007 | Velasco et al. |
| 7,209,997 B2 | 4/2007 | Farmwald et al. |
| 7,254,452 B2 | 8/2007 | Davlin et al. |
| 7,319,418 B2 | 1/2008 | Fink |
| 7,366,115 B2 | 4/2008 | Vandensande |
| 7,366,597 B2 | 4/2008 | Hartrey et al. |
| 7,466,123 B2 | 12/2008 | Kato et al. |
| 7,558,646 B2 | 7/2009 | Matsumoto et al. |
| 7,668,674 B2 | 2/2010 | McNutt et al. |
| 7,717,085 B1 | 5/2010 | Bauerle |
| 7,761,251 B2 | 7/2010 | Bauerle |
| 7,774,074 B2 | 8/2010 | Davlin et al. |
| 7,877,208 B1 | 1/2011 | Battista |
| 7,990,983 B2 | 8/2011 | Denham |
| 7,996,104 B2 | 8/2011 | Wielebski et al. |
| 8,122,159 B2 | 2/2012 | Monreal |
| 8,290,094 B2 | 10/2012 | Kolof et al. |
| 8,380,905 B2 | 2/2013 | Djabbari et al. |
| 8,386,657 B2 | 2/2013 | Adkins et al. |
| 8,461,782 B2 | 6/2013 | Ward et al. |
| 8,543,263 B2 | 9/2013 | Danielsson et al. |
| 8,577,634 B2 | 11/2013 | Donovan et al. |
| 8,716,674 B2 | 5/2014 | Sherwood |
| 9,003,096 B2 | 4/2015 | Trifonov et al. |
| 2001/0011892 A1 | 8/2001 | Ropke |
| 2002/0010527 A1 | 1/2002 | Wielebski et al. |
| 2002/0015389 A1 | 2/2002 | Wastlhuber et al. |
| 2002/0053970 A1 | 5/2002 | Plummer |
| 2003/0220702 A1 | 11/2003 | McNutt |
| 2004/0039456 A1 | 2/2004 | Davlin et al. |
| 2004/0078097 A1 | 4/2004 | Bruzy et al. |
| 2004/0100394 A1 | 5/2004 | Hitt |
| 2004/0117537 A1 | 6/2004 | Vandensande |
| 2004/0233929 A1 | 11/2004 | Hall et al. |
| 2005/0035733 A1 | 2/2005 | Karwath et al. |
| 2005/0055132 A1 | 3/2005 | Matsumoto et al. |
| 2005/0128100 A1 | 6/2005 | Petrocy |
| 2005/0128830 A1 | 6/2005 | Nishihara et al. |
| 2005/0228914 A1 | 10/2005 | Ishida |
| 2005/0267701 A1 | 12/2005 | McNutt |
| 2005/0273287 A1 | 12/2005 | McNutt |
| 2005/0289269 A1 | 12/2005 | Nakayama et al. |
| 2006/0024055 A1 | 2/2006 | Kawase et al. |
| 2006/0030951 A1 | 2/2006 | Davlin et al. |
| 2006/0041630 A1 | 2/2006 | Naismith |
| 2006/0221984 A1 | 10/2006 | Denham |
| 2006/0224776 A1 | 10/2006 | Vanderhenst |
| 2006/0282592 A1 | 12/2006 | Zakriti |
| 2007/0094459 A1 | 4/2007 | Suzuki et al. |
| 2007/0198139 A1 | 8/2007 | Boran et al. |
| 2007/0236164 A1 | 10/2007 | Xia et al. |
| 2007/0236825 A1 | 10/2007 | Xia et al. |
| 2008/0061725 A1 | 3/2008 | Wu et al. |
| 2008/0098144 A1 | 4/2008 | Rees et al. |
| 2008/0115512 A1 | 5/2008 | Rizzo |
| 2008/0177397 A1 | 7/2008 | Davlin et al. |
| 2008/0189459 A1 | 8/2008 | Takeuchi |
| 2008/0288662 A1 | 11/2008 | Doorenbos |
| 2009/0185081 A1 | 7/2009 | Ueno et al. |
| 2010/0095035 A1 | 4/2010 | Chen et al. |
| 2010/0185841 A1 | 7/2010 | Monreal |
| 2010/0211190 A1 | 8/2010 | Akita |
| 2010/0231262 A1 | 9/2010 | Ito |
| 2011/0055442 A1 | 3/2011 | Ward et al. |
| 2011/0205600 A1 | 8/2011 | Hibiya |
| 2012/0083902 A1* | 4/2012 | Daum .................... H04B 3/548 700/3 |
| 2012/0086442 A1 | 4/2012 | Haas et al. |
| 2012/0131231 A1 | 5/2012 | Monreal |
| 2012/0158335 A1 | 6/2012 | Donovan et al. |
| 2012/0325020 A1 | 12/2012 | Mueller |
| 2013/0197851 A1 | 8/2013 | Bhawmik |
| 2013/0335068 A1 | 12/2013 | Dwyer et al. |
| 2014/0086258 A1 | 3/2014 | Kwan et al. |
| 2014/0214970 A1* | 7/2014 | Rasbornig ............... H04L 51/30 709/206 |
| 2014/0258566 A1 | 9/2014 | Bowling et al. |
| 2015/0100818 A1 | 4/2015 | Kegel et al. |
| 2015/0227204 A1 | 8/2015 | Gipson et al. |

FOREIGN PATENT DOCUMENTS

| | | |
|---|---|---|
| DE | 101 47 512 | 4/2003 |
| EP | 1 467 523 | 10/2004 |
| FR | 2885710 A1 | 11/2006 |
| GB | 2 353 448 | 2/2001 |
| JP | H1032479 | 2/1998 |
| JP | H 11 85806 | 3/1999 |
| JP | 2003-044972 | 2/2003 |
| JP | 2003/279651 | 10/2003 |
| JP | 2006/242908 | 9/2006 |
| JP | 2007/272807 | 10/2007 |
| JP | 2008/22638 A | 1/2008 |
| JP | 2010/127857 | 6/2010 |
| WO | WO 2014/167090 A1 | 10/2014 |

OTHER PUBLICATIONS

"Digital Temperature Sensor with I²C™ Interface;" Burr-Brown Products from Texas Instruments; TMP100, TMP101; XP-002671327; Jan. 2002—revised Nov. 2007; Package Option Addendum dated Aug. 20, 2011; 19 pages.

"Single Edge Nibble Transmission for Automotive Applications;" SAE International; Surface Vehicle Information Report; SAE J2716JAN2010; XP-008149400; dated Apr. 2007, revised Jan. 2010; pp. 1-56.

"The I²C Bus Specification;" Version 2.1; Philips Semiconductors; XP-002590803; Jan. 2000; pp. 1-46.

"TMS320x281x, 280x DSP Serial Peripheral Interface (SPI) Reference Guide;" Texas Instruments; Literature No. SPRU059B; XP-002369243; dated Jun. 2002, revised Nov. 2004; 50 pages.

(56) References Cited

OTHER PUBLICATIONS

Office Action dated May 23, 2013; for U.S. Appl. No. 12/968,353; 8 pages.
Response filed Jul. 18, 2013; for Office Action dated May 23, 2013; for U.S. Appl. No. 12/968,353; 12 pages.
Notice of Allowance dated Aug. 5, 2013; for U.S. Appl. No. 12/968,353; 8 pages.
PCT Search Report and Written Opinion of the ISA; dated Mar. 21, 2012; for PCT Pat. App. No. PCT/US2011/052861; 14 pages.
International Preliminary Report on Patentability dated Jun. 27, 2013, PCT/US2011/052861, 11 pages.
PCT Notification of Transmittal of the ISR & Written Opinion dated Apr. 23, 2015 corresponding to International Application No. PCT/US2015/011347; 1 Page.
PCT International Search Report dated Apr. 23, 2015 corresponding to International Application No. PCT/US2015/011347; 3 Pages.
PCT Written Opinion of the ISA dated Apr. 23, 2015 corresponding to International Application No. PCT/US2015/011347; 6 Pages.
Response to Office Action dated Feb. 18, 2015 corresponding to U.S. Appl. No. 14/182,595; Response Filed on May 13, 2015; 12 Pages.
Office Action dated Nov. 13, 2015; For U.S. Appl. No. 14/645,946; 34 pages.
German Office Action (with English Translation) dated May 18, 2015 corresponding to German Patent Application No. 112009004394.1; 33 Pages.
Response to Office Action filed Jul. 13, 2015 for German Patent Application No. 112011104425.9; 27 pages.
Korean Office Action with English translation dated Jul. 19, 2016 for Korean Application No. 10-2013-7015958; 7 pages.
Notice of Allowance dated Apr. 29, 2016; For U.S. Appl. No. 14/645,946; 9 pages.
Office Action including English translation dated Mar. 9, 2015 for German Application No. 112011104425.9; 18 pages.
PSI5 Organization: Peripheral Sensor Interface for Automotive Applications; Jul. 29, 2008; PSI5 Technology Specification, V1.3, 47 pages.
Standard SAE J27162010-01. SENT—Single Edge Nibble Transmission for Automotive Applications; Apr. 2007, 56 pages.
Decision on Appeal dated Jun. 20, 2016 corresponding to U.S. Appl. No. 13/344,959; 9 Pages.
Examiner's Pre-Trial Report dated Jul. 3, 2015 for Japanese Application No. 2013-544466; 8 pages.
Response dated Mar. 11, 2016 to Office Action dated Nov. 13, 2015; For U.S. Appl. No. 14/645,946; 16 pages.
Japanese Office Action dated Feb. 5, 2015 (including translation) for Japanese patent application No. 2013-544466; 5 pages.
Response to Japanese Office Acton filed Mar. 27, 2015 (Including English claims and letter from Yuasa and Hara dated Mar. 6, 2015) for Japanese patent application No. 2013-544466; 18 pages.
Search Report and Written Opinion dated Jul. 5, 2016 for PCT Application No. PCT/US2016/019457, 10 pages.
Office Action dated Jul. 6, 2016 for U.S. Appl. No. 14/645,946, 16 pages.
PCT International Preliminary Report dated Aug. 23, 2016 corresponding to International Application No. PCT/US2015/011347; 7 Pages.
Request for Continued Examination (RCE) and Response to Final Office Action dated Jun. 7, 2013 for U.S. Appl. No. 13/344,959; RCE and Response filed on Aug. 9, 2016; 19 Pages.
Japanese Appeal Decision with English translation dated Aug. 24, 2016 for Japanese Application No. 2013-544466; 21 pages.
Amendment filed on Sep. 9, 2016 for U.S. Appl. No. 14/645,946; 16 pages.
Notice of Allowance dated Oct. 12, 2016 for U.S. Appl. No. 13/344,959; 7 pages.

Search Report and Written Opinion dated Jun. 2, 2016 for PCT Application No. PCT/US2016/019451; 9 pages.
Response to German Office Action dated May 18, 2015 corresponding to German Patent Application No. 112009004394.1; Response filed on Aug. 7, 2015; 77 Pages.
Notice of Allowance dated Aug. 19, 2015 corresponding to U.S. Appl. No. 14/182,595; 21 Pages.
Response filed on Sep. 9, 2016, to Office Action dated Jul. 6, 2016; for U.S. Appl. No. 14/645,946; 16 pages.
European Patent Office Communication Pursuant to Rules 161(1) and 162 EPC dated Sep. 16, 2016, 2 pages.
Written Petition filed on Aug. 26, 2015 with English translation for Japanese Patent Application No. 2013-544466; 13 pages.
German Decision to Grant dated Sep. 10, 2015 corresponding to German Application No. 112009004394.1; 12 Pages.
U.S. Appl. No. 14/645,946, filed Mar. 12, 2015, Scheinkerman et al.
"3-Axis Digital Compass IC, HMC5883L;" Honeywell Advanced Information; XP-002671326; Oct. 2010; 18 Pages.
"Digital Temperature Sensor with I²C™ Interface;" Burr-Brown Products from Texas Instruments; TMP100,TMP101; XP-002671327; Jan. 2002—Revised Nov. 2007; Package Option Addendum dated Aug. 20, 2011; 19 Pages.
"Single Edge Nibble Transmission for Automotive Applications;" SAE International; Surface Vehicle Information Report; SAE J2716 Jan. 2010; Issued Apr. 2007—Revised Jan. 2010; 56 Pages.
"The I²C Bus Specification;" Version 2.1; Phillips Semiconductors; XP-002590803; dated Jan. 2000; 46 Pages.
"TMS320x281x, 280x DSP Serial Peripheral Interface (SPI) Reference Guide;" Texas Instruments; Literature No. SPRU059B; XP-002369243; Issued Jun. 2002—Revised Nov. 2004; 50 Pages.
AN1816, Using the HC912B32 to Implement the Distributed Systems Interface (DSI) Protocol; by Tracy McHenry, Motorola, Freescale Semiconductor, Inc., Aug. 1999, 24 pages.
DSI Bus Standard, Version 2.02, TRW Automotive, Launched by Motorola, Freescale Semiconductor, Mar. 29, 2005, 18 pages.
Freescale Semiconductor, Advance Information "Two-Channel Distributed System Interface (DSI) Physical Interface Device", Document No. MC33790, Rev 11.0, Mar. 2008, 12 pages.
Freescale Semiconductor,Inc., "Distributed System Interface (DSI) Sensor Interface", Document No. MC33793/D, Motorola, Semiconductor Technical Data, Rev 10, Jul. 2003, 24 pages.
Infineon Technologies, Application Note for part TLE4998C, Rev. 1.0, Feb. 2009 "User Programming Guide", 30 pages.
Office Action dated Feb. 18, 2015; for U.S. Appl. No. 14/182,595; 18 pages.
German Office Action (with English Translation) dated Oct. 16, 2012 for German Appl. No. 11 2009 004 394.1; 15 Pages.
Response to German Office Action (with English Translation) dated Oct. 16, 2012 for German Appl. No. 11 2009 004 394.1; Response filed on Feb. 18, 2013; 64 Pages.
Japanese Office Action English Translation dated Jan. 14, 2014 for Japanese Appl. No. 2012-526825; 3 Pages.
Japanese Final Decision of Rejection (with English Translation) dated Aug. 5, 2014 for Japanese Appl. No. 2012-526825; 4 Pages.
Appeal/Response (with English Translation of Claims) to Japanese Final Decision of Rejection dated Aug. 5, 2014 for Japanese Appl. No. 2012-526825; Appeal filed on Dec. 3, 2014; 18 Pages.
Japanese Office Action (with English Translation) dated Jul. 3, 2014 for Japanese Pat. Appl. No. 2013-544466; 8 Pages.
Response to Japanese Office Action (with English Claims) dated Jul. 3, 2014 for Japanese Pat. Appl. No. 2013-544466; Response filed Aug. 21, 2014; 11 Pages.
Korean Office Action (with English Translation) dated Mar. 31, 2014 for Korean Appl. No. 10-2012-7007744; 8 Pages.
Response to Korean Office Action dated Mar. 31, 2014 for Korean Appl. No. 10-2012-7007744; Response Filed May 23, 2014; 40 Pages.
Korean Notice of Decision of Refusal (with English Translation) dated Oct. 29, 2014 for Korean Appl. No. 10-2012-7007744; 6 Pages.

(56) References Cited

OTHER PUBLICATIONS

Response to Korean Notice of Decision of Refusal dated Oct. 29, 2014 for Korean Appl. No. 10-2012-7007744; Response filed on Jan. 27, 2015; 21 Pages.

PCT International Search Report and Written Opinion of the ISA dated Mar. 4, 2010; for PCT Pat. App. No. PCT/US2009/066068; 9 Pages.

PCT International Preliminary Report on Patentability and Written Opinion of the ISA dated Jul. 28, 2011; for PCT Pat. App. No. PCT/US2009/066068; 5 Pages.

PCT International Search Report and Written Opinion of the ISA dated Oct. 18, 2010; for PCT Pat. App. No. PCT/US2010/045403; 16 Pages.

PCT International Preliminary Report on Patentability and Written Opinion of the ISA dated Mar. 8, 2012; for PCT Pat. App. No. PCT/US2010/045403; 11 Pages.

PCT International Search Report and Written Opinion of the ISA dated Mar. 21, 2012; for PCT Pat. App. No. PCT/US2011/052861; 15 Pages.

PCT International Preliminary Report on Patentability and Written Opinion of the ISA dated Jun. 27, 2013; for PCT Pat. App. No. PCT/US2011/052861; 11 Pages.

U.S. Appl. No. 13/344,959.

U.S. Appl. No. 12/548,815.

U.S. Appl. No. 12/968,353.

Korean Notice of Allowance with English Translation and Allowed Claims dated Jan. 5, 2017 for Korean Application No. 10-2013-7015958; 8 Pages.

Notice of Allowance dated Jan. 17, 2017 for U.S. Appl. No. 14/645,946; 5 pages.

European 161/162 Communication dated Sep. 16, 2016 corresponding to European Application No. 15706301.7; 2 Pages.

Response (with Amended Claims) to European 161/162 Communication dated Sep. 16, 2016 corresponding to European Application No. 15706301.7; Response filed on Mar. 21, 2017; 12 Pages.

Non-Final Office Action dated Nov. 13, 2015, for U.S. Appl. No. 14/645,946; 34 pages.

German Office Action dated Jul. 28, 2017 with English translation for German application No. 112011104425.9; 12 pages.

* cited by examiner

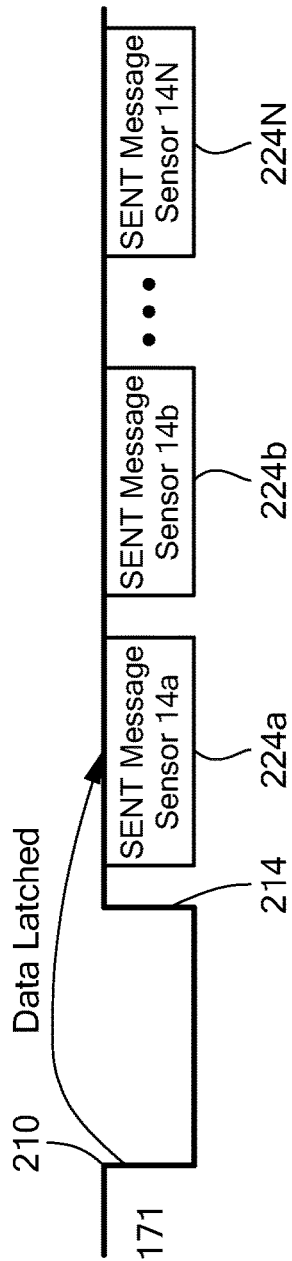
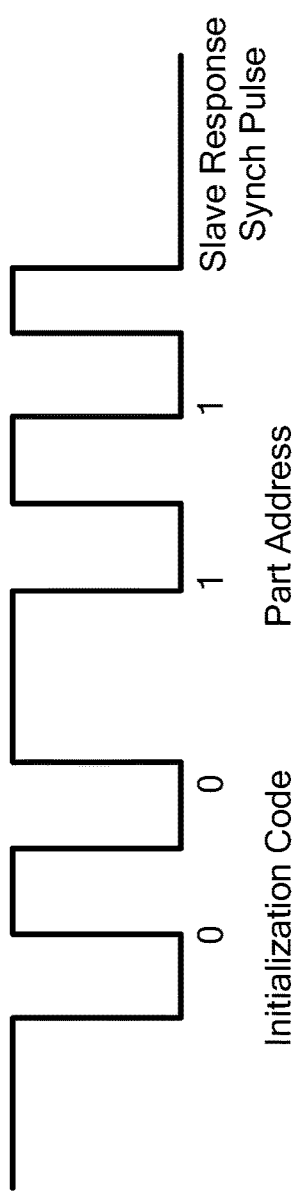
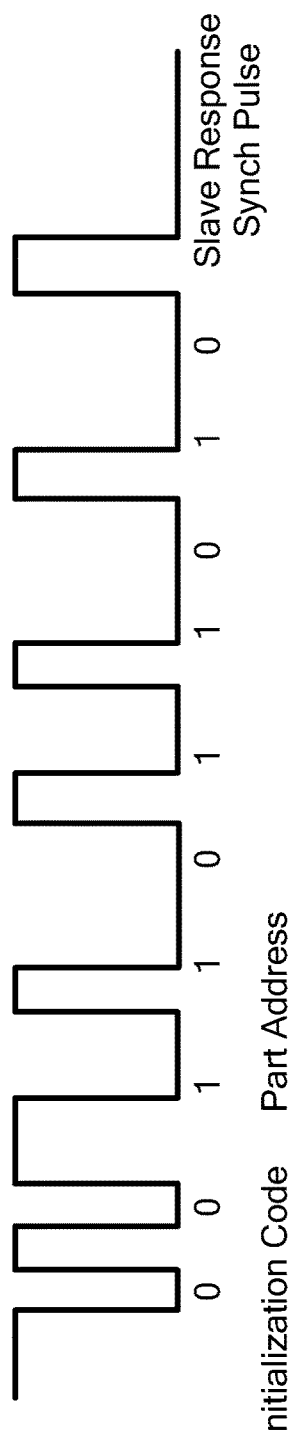
FIG. 4
FIG. 5A
FIG. 5B

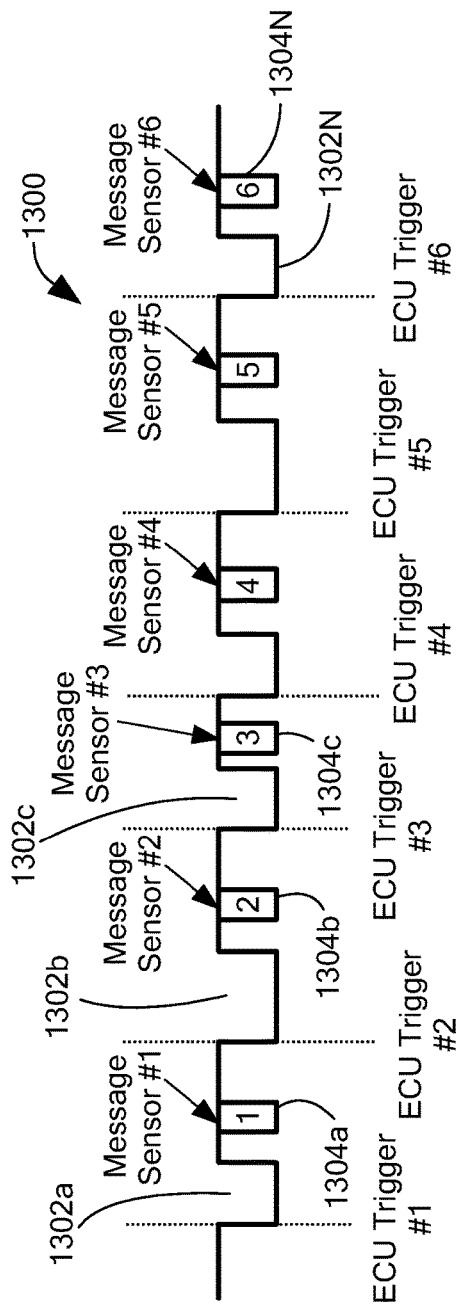
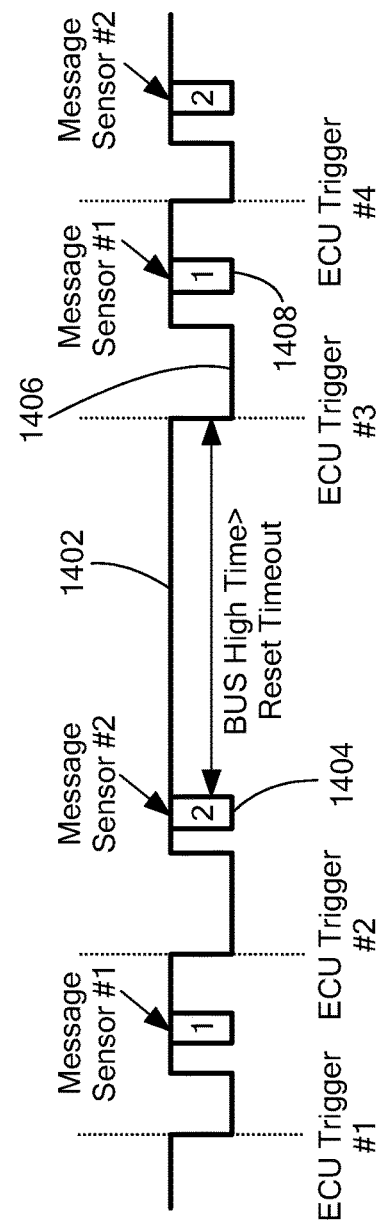
FIG. 13
FIG. 14

SIGNALING BETWEEN MASTER AND SLAVE COMPONENTS USING A SHARED COMMUNICATION NODE OF THE MASTER COMPONENT

CROSS-REFERENCE TO RELATED APPLICATIONS

This application is a continuation-in-part application of, and claims priority to, U.S. patent application Ser. No. 14/182,595 (filed Feb. 18, 2014), which is incorporated here by reference in its entirety.

BACKGROUND

Sensors are used to monitor various parameters of a system. For example, in vehicle systems, parameters such as current, speed, angle, linear position, and rotational direction of an article associated with a control module, such as a power steering module, a fuel injection module, and an anti-lock brake module, are often monitored. The sensor output signal is provided to a system controller, such as an Engine Control Unit (ECU), that processes the sensor output signal and may generate a feedback signal for desired operation of the control module. Conventionally, the sensor updates the sensed parameter periodically and the controller polls the sensor for data as needed for processing.

SUMMARY

In an embodiment, a network slave device includes a transceiver for communicating over a communication bus in accordance with a point-to-point network protocol. The network slave device may include an address to identify the network slave device on the network. It may also include a communication circuit configured to process a command received by the transceiver and generate a reply for transmission over the communication bus if an address included in the command matches the address of the slave device.

In another embodiment, a system includes one or more slave devices coupled to a communication bus. One or more of the slave devices has an address to identify the respective slave device. The slave devices may be configured to communicate over the communication bus in accordance with a point-to-point communication protocol. A master device may be configured to communicate over the communication bus in accordance with the point-to-point communication protocol and to send commands to a selected slave device of the one or more slave devices, the commands comprising an address of the selected slave device.

In another embodiment, a method includes communicating over a communication bus in accordance with a point-to-point communication protocol by one or more slave devices. Each slave devices may have a respective address and configured to respond to commands that include the respective address. A master device coupled to the communication bus may send a command to the one or more slave devices, the command including a selected address of a selected slave device of the one or more slave devices.

BRIEF DESCRIPTION OF THE DRAWINGS

FIG. 4 is a timing diagram showing a trigger signal sent to a plurality of sensors of FIG. 1 to illustrate the timing of sensor data storing and transmission of the respective serial data signal by each of the sensors under the control of the trigger signal.

FIG. 5A is an example of a trigger signal used to retrieve data from a selected sensor.

FIG. 5B is another example of a trigger signal used to retrieve data from a selected sensor.

FIG. 13 is a timing diagram of transmission sequence, including a predetermined sequence of replies, between a master and multiples slaves on a communication node.

FIG. 14 is a timing diagram of another transmission sequence, including a predetermined sequence of replies and a reset timeout, between a master and multiples slaves on a communication node.

Like figures in the drawings denote like elements.

DETAILED DESCRIPTION

Figure 1:
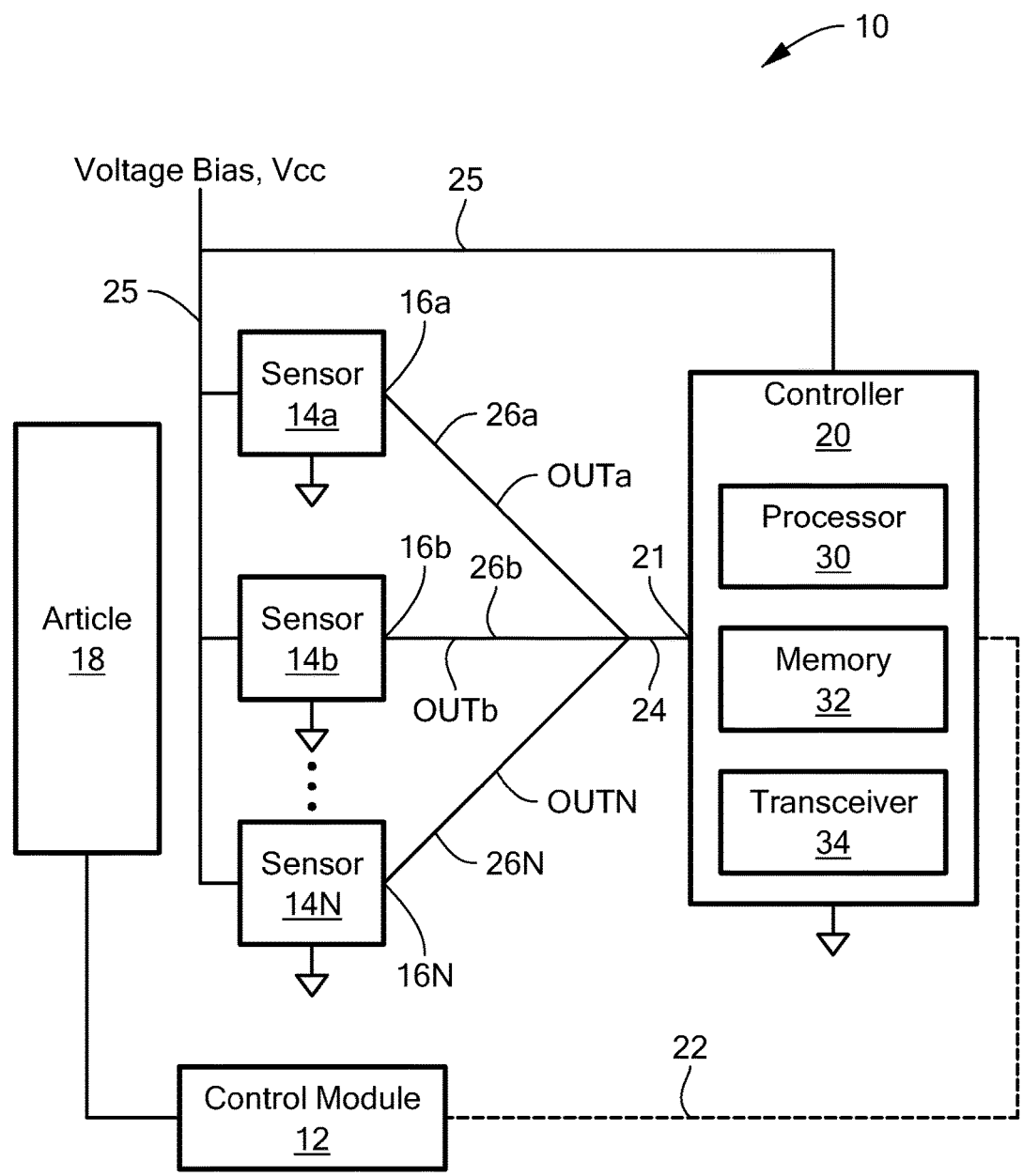
FIG. 1 is a block diagram depicting a sensor system with sensors sharing a communication node of the controller.

As used herein, the term "magnetic field sensing element" is used to describe a variety of electronic elements that can sense a magnetic field. The magnetic field sensing element can be, but is not limited to, a Hall Effect element, a magnetoresistance element, or a magnetotransistor. As is known, there are different types of Hall Effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, a magnetic tunnel junction (MTJ), a spin-valve, etc. The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR, spin-valve, linear spin-valve, etc.) and vertical Hall elements tend to have axes of sensitivity parallel to a substrate.

It will be appreciated by those of ordinary skill in the art that while a substrate (e.g. a semiconductor substrate) is described as "supporting" the magnetic field sensing element, the element may be disposed "over" or "on" the active semiconductor surface, or may be formed "in" or "as part of" the semiconductor substrate, depending upon the type of magnetic field sensing element. For simplicity of explanation, while the embodiments described herein may utilize any suitable type of magnetic field sensing elements, such elements will be described here as being supported by the substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor may be used in combination with a back-biased or other magnet, and a magnetic field sensor that senses a magnetic field density of a magnetic field.

As used herein, the term "target" is used to describe an object to be sensed or detected by a magnetic field sensor or magnetic field sensing element. A target may be ferromagnetic or magnetic.

As used herein, the term "predetermined," when referring to a value or signal, is used to refer to a value or signal that is set, or fixed. In embodiments, the predetermined value or signal is set in the factory at the time of manufacture, or by external means, e.g., programming, thereafter. As used herein, the term "determined," when referring to a value or signal, is used to refer to a value or signal that is identified by a circuit during operation, after manufacture.

As controllers operate at faster speeds, in many cases considerably faster than the sensor, it becomes advantageous for the controller to synchronize the sensor output data transmission so that the newest available data is provided for use by the controller. Not only is synchronizing the sensor output data transmission important but also the synchronization of the sampling of the sensor data when multiple sensors are used is important. Thus, information from multiple sensors may be derived with data sourced from the same moment in time.

Described herein are techniques for slave components to share a single communication node of a master component. In one example, multiple slave components respond in turn to one trigger sent from the communication node to the slave components. A trigger signal may also be referred to as a command signal. In another example, the slave components hold their data in response to the one trigger sent from the communication node and the data is read at a later time by another trigger signal. The data may be read using a Manchester encoded input that is sent from the communication node and is used to select a specific slave component for response. The data may also be read using a point-to-point serial data protocol (i.e. a single master and single slave protocol) such as a SENT message, for example.

Though sensors are used herein to represent slave components, one of ordinary skill in the art would recognize that there are other examples of slave components that may be used. Also, other sensors, controllers and other system embodiments not specifically described herein are described in U.S. Pat. No. 8,577,634, entitled "Systems and Methods for Synchronizing Sensor Data," which was issued Nov. 5, 2013 and has the same assignee as the present patent application and is incorporated herein in its entirety.

Referring to FIG. 1, a system 10 includes sensors 14a-14N configured to sense a parameter associated with an article 18 that may be controlled by a control module 12. Each of the sensors 14a-14N has a respective bidirectional node 16a-16N and is configured to generate, update, and optionally store (e.g., latch) sensor data. The sensors 14a-14N also are configured to communicate sensor data to a communication node 21 of a system controller 20 in a respective serial data signal 26a-26N from the respective bidirectional node 16a-16n in response to a trigger signal 24 from the communication node 21 of the controller 20 and received at the respective bidirectional node 16a-16N. The sensors 14a-14N are further coupled to the controller 20 via a power, or Voltage Bias, Vcc connection 25. The controller 20 may provide a feedback signal 22 to the control module 12 for use in controlling the article 18.

The sensors 14a-14N may additionally store the sensor data in response to the trigger signal. Communication buses, OUT1, OUT2, . . . OUTN, may be coupled between the sensor 14a-14N and the communication node 21 of the controller 20. As will be described further herein each of the sensors 14a-14N is configured to at least monitor signals from the other sensors 14a-14N accessing the communication node 21. Thus, the communication node 21 is a shared node. One of ordinary skill in the art would recognize that the communication node 21 may be also a shared bus.

With this arrangement, communicating sensor data is synchronized by the trigger signal 24 received at the bidirectional nodes 16a-16N, which are the same nodes at which the sensor output data are provided in the serial data signals 26a-26N. Sensor data synchronization in this manner can reduce sensor output data latency and also reduces the number of sensor connections otherwise required to permit receipt of an external synchronization signal by the sensor. A reduced pin count not only reduces cost and circuit area, but also reduces effects of electromagnetic interference (EMI). In some embodiments in which both the data storing function and the output data transmission function are synchronized in this manner, ambiguities in the age of the sensor output data can be reduced or eliminated (e.g., multiple sensors are told to sample their data at the same time using a single trigger).

The sensors 14a-14N may sense various parameters of an article 18, including, but not limited to current, speed, angle, linear position, turns count (e.g., for angular sensors or steering wheel applications) and rotational direction. For example, the control module 12 may be a vehicle power steering module, in which case the article 18 may be a magnet associated with the steering unit and the sensor 14a may sense the strength of a magnetic field associated with the magnet for use by the controller 20 to determine an angle of the wheel or steering column. In another example, the control module 12 may be a fuel injection module in which case the article 18 may be a camshaft gear and the magnetic field strength associated with the gear can be sensed by the sensors 14a-14N and used by the controller to determine the speed of rotation and/or the rotational position of the gear. More generally however, the sensors 14a-14N sense a characteristic associated with the article, such as magnetic field strength in the illustrative embodiments, and the controller 20 processes the sensor output data to arrive at the desired parameter information, such as speed or direction of rotation. It will be appreciated by those of ordinary skill in the art that the concepts described herein have applicability to various systems, sensors, articles, control modules, sensed characteristics, and parameters, including closed loop systems as shown and open loop systems.

The controller 20 may take various forms depending on the sensor system 10 and its application. For example, in the case of a vehicle system, the controller 20 may be an Engine Control Unit (ECU) that includes a processor 30, a memory 32, and a transceiver 34 for controlling various aspects of vehicle safety and operation.

The serial data signals 26a-26N provided by the sensors 14a-14N at the sensor bidirectional nodes 16a-16N have a standard unidirectional signal format. Suitable unidirectional signal formats include Single-Edge Nibble Transmission (SENT), Serial Peripheral Interface (SPI), Peripheral Serial Interface 5 (PSI5) and Inter-Integrated Circuit (I²C). In the illustrative embodiment, the serial data signals 26a-26N is in the SENT format as defined by a Society of Automotive Engineers (SAE) J2916 Specification which is hereby incorporated by reference in its entirety and as described generally in connection with FIG. 3. In one example, the serial data signal includes one or more of a serial binary signal and a pulse width modulated (PWM) signal. However, the serial data signal may include other formats as well, as will be discussed below.

Each of the sensors 14a-14N may sense the same characteristic of a single article 18 associated with a single control module 12 as may be desirable for redundancy or in sensor systems in which multiple sensors are necessary to provide the desired data, such as for direction detection and angle detection with multiple CVH sensor die. Alternatively, each sensor 14a-14N may sense a different characteristic associated with the same or different articles, which articles are associated with the same or with different control modules.

As noted above and described below, the sensor data is communicated in a serial data signal (e.g., 26a-26N) in response to detection of a trigger signal (e.g., 24) (sent from a communication node (e.g., 21) of a controller (e.g., 20)), received at the bidirectional node (e.g., 16a-16N) and optionally is additionally stored in response to detection of the trigger signal. In embodiments in which both sensor data storing and transmission functions occur in response to the trigger signal, the data storing and data communication functions may occur in response to detection of same feature of the trigger signal 24, resulting in common control of the storing and data communication functions by the trigger signal 24. Alternatively, the sensor data may be stored in response to detection of a first feature of the trigger signal 24 and the stored data may be communicated in the serial data signal 26a-26N in response to detection of a second feature of the trigger signal 24, resulting in independent control of the storing and data communication functions by the trigger signal 24. Such independent control functions may be particularly advantageous in systems in which a plurality of sensors are used (e.g., for redundancy) to sense the same parameter, since it may be desirable to have all of the sensors sample and store (i.e., hold) the sensor data at the same time, but communicate the stored sensor data at different times as best suited for processing by the controller.

Figure 2:
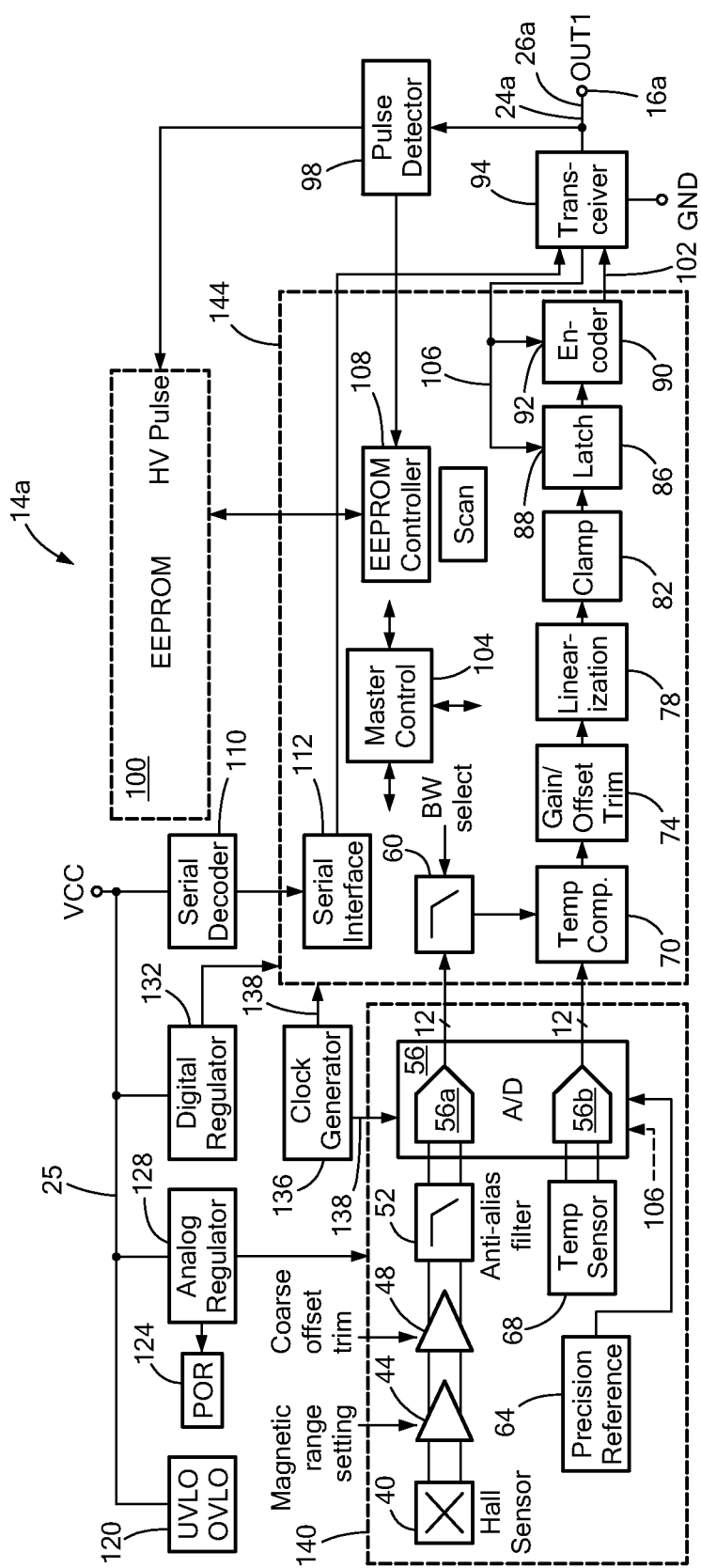
FIG. 2 is a block diagram showing a magnetic field sensor suitable for use in the sensor system of FIG. 1.

Referring also to FIG. 2 in which like elements are labeled with like reference characters, an illustrative sensor 14a includes a sensing element 40, here a magnetic field sensing element, such as a Hall Effect element (e.g., a circular vertical Hall). Other types of magnetic field sensing elements such as magnetoresistive elements (for example, a giant magnetoresistance (GMR) element, an anisotropic magnetoresistance (AMR) element, a tunneling magnetoresistance (TMR) element, a magnetic tunnel junction (MTJ) element, a spin valve element, an Indium antimonide (InSb) sensor, a Gallium Arsenide (GaAs) sensor), and circular vertical Hall Element are also suitable. Furthermore, the sensing element 40 may sense other types of characteristics such as temperature, pressure and so forth. The sensing element 40 may be a single ended or differential arrangement and may include one or more individual sensing elements in various known configurations.

The magnetic field sensing element 40 is coupled to interface signal processing circuitry which may include one of more of the following circuits and which generates sensor data that is provided to the controller 20 (FIG. 1) via the serial data signal 26a. An amplifier 44 allows for setting the magnetic field range to be sensed and a further amplifier 48 may permit a course adjustment of the offset. In one illustrative embodiment, the magnetic field range may be selected to be between approximately +/−100 Gauss to +/−2250 Gauss. Offset refers to the degree to which the sensed magnetic field signal (i.e., the output of the sensing element 40) is centered at zero magnetic field. An output of the amplifier 48 is filtered, here by an anti-aliasing filter 52, to provide a filtered signal to an analog-to-digital (A/D) converter 56 that receives a precision reference voltage from reference 64 and a clock signal 138 from a clock generator 136, as shown. Here, the A/D converter 56 includes a first converter 56a configured to provide a 12-bit output indicative of the level of the sensed magnetic field to a further filter, here a low pass filter 60.

The sensor 14a may include a temperature compensation circuit 70 to compensate the sensed magnetic field signal for changes due to temperature. To this end, a temperature sensor 68 senses an ambient temperature of the sensor 14a and provides an analog signal indicative of the temperature to an A/D converter 56b, as shown. Converter 56b provides, for example, a 12-bit output signal indicative of the ambient temperature to the temperature compensation circuit 70. In the illustrative embodiment, the temperature compensation circuit 70 implements a polynomial fit of the temperature signal from converter 56b to a temperature correction equation in order to cancel the deleterious effects of temperature variations on device sensitivity and offset, where sensitivity refers to a change in output signal level per change in Gauss level.

An output of the temperature compensation circuit 70 is coupled to a gain/offset trim circuit 74 which may employ various conventional techniques for gain and offset adjustment. A linearization circuit 78 is used to linearize the sensor output in response to non-linear magnetic fields. To this end, the output signal range is divided into a predetermined number of segments, such as thirty-two equal segments, and the linearization circuit 78 applies a linearization coefficient factor to each segment. The linearization coefficients may be stored in a look-up table in an EEPROM as described in U.S. Pat. No. 8,350,563, which is entitled "Magnetic Field Sensor and Method Used in a Magnetic Field Sensor that Adjusts a Sensitivity and/or an Offset Over Temperature" and issued Jan. 8, 2012 and has the same assignee as the present patent application and is incorporated herein in its entirety.

A clamp circuit 82 coupled to the output of the linearization circuit 78 permits signal limiting and provides digital sensor data thus processed to the latch 86.

A latch 86 receives and stores (i.e., latches) digital sensor data from the interface circuitry. The latch 86 may be responsive to a trigger signal (e.g., 24, FIG. 1) received at the bidirectional node 16a to cause the digital sensor data to be stored. More particularly, a buffered version of the trigger signal 24 (i.e., signal 106) is provided to a control node 88 of the latch 86 and contains the buffered trigger signal for detection by the latch 86. In other embodiments, the data is stored by the latch 86 independently of the trigger signal 24. An output node of the latch is coupled to an encoder 90, as shown.

The encoder 90 is configured to communicate the sensor data, here digital sensor data, in the serial data signal 26a at the bidirectional node 16a in response to the trigger signal 24 received at the bidirectional node 16a. In the illustrative embodiment, the serial data signal 26a has a standard unidirectional signal format and, in particular has the SENT format. More particularly, signal 106 provided by the transceiver to a control node 92 of the encoder contains the trigger signal for detection by the encoder. The encoder 90 provides the serial data signal 26a at the bidirectional sensor node 16a via a transceiver 94.

In view of the above description, it will be apparent that in the illustrative embodiment, the latch 86 stores digital sensor data in response to the trigger signal 24 and the serial data signal 26a is a digital signal. However, it will be appreciated by those of ordinary skill in the art that alternatively, the sensor data may be stored and/or communicated to the controller 20 in analog form, by analog circuitry and techniques accordingly.

It will also be appreciated by those of ordinary skill in the art that the sensor data may not be "sampled and stored" in a conventional fashion with a dedicated storage device. In one example, the latch 86 may be eliminated and the trigger signal 24 in the form of buffered signal 106 may be provided to a control node of the A/D converter 56a (as shown in phantom in FIG. 2), in which case generating and/or updating of the sensor data occurs in the A/D in response to the trigger signal 24, as may be advantageous.

The sensor 14a includes an EEPROM 100 in which programmable registers store user selections for programmable features. In other embodiments, sensor 14a may include another type of memory, such as a FLASH memory, random access memory (RAM), or other type of read-only memory (ROM), replacing or in addition to EEPROM 110. In embodiments, EEPROM 100 and/or the other type of memory may be an on-chip memory, i.e. a memory that is supported by a semiconductor substrate that may be the same semiconductor substrate that supports the various circuits comprising sensor 14a. Various schemes are suitable for programming communication between the controller 20 and the sensor 14a.

A Manchester encoding scheme may be used with which the controller 20 sends commands to the sensor 14a via the Vcc connection 25, such as a Write Access Command, a Write Command, and a Read Command. In response to a Read Command, the sensor 14a may respond with a Read Acknowledge signal via bus OUT1 that contains the requested data.

Each senor may include a transceiver for communicating over a communication bus in accordance with a point-to-point network protocol, an address to identify the network slave device, and a communication circuit configured to process commands received by the transceiver and generate a reply for transmission over the communication bus if an address included in the command matches the address of the slave device. The address may be stored in a memory of the sensor, such as an EEPROM for example.

A communication circuit and transceiver including a serial decoder 110 translates the Vcc signal level (e.g., having a signal of 5-8 volts) into a logic signal and a serial interface 112 decodes the resulting logic signal into a binary command signal. For example, in the case of a Write Command, the binary command signal at the output of the serial interface 112 indicates to an EEPROM controller 108 the address of the register to be written and the data to be written. A Write Access Command unlocks the device for writing. In the case of a Read Command, the binary signal output of the serial interface 112 presents the contents of the selected register to the transceiver for communication at the bidirectional node 16a.

In order to write to the EEPROM, the controller 20 (FIG. 1) sends a Disable Output Command to put the bidirectional node 16a into a high impedance state. The controller 20 also sends high voltage pulses to the sensor in order to boost the voltage on the EEPROM gates. To this end, a pulse detector 98 is coupled to the bidirectional node 16a and to the EEPROM controller 108. After writing is complete, the controller 20 sends an Enable Output Command to bring the bidirectional node 16a from its high impedance state to a value indicative of the sensed magnetic field. Preferably, the bidirectional node 16a is also put into a high impedance state before a Read Command is sent until after the Read Acknowledge signal is returned.

Various features of the sensor 14a are programmable in the above-described manner, including but not limited to the magnetic field range via amplifier 44, the course offset trim via amplifier 48, the bandwidth via filter 60 and so forth. According to the invention, a sensor data communication mode is also programmable. Specifically, the sensor 14a can be programmed to dictate whether the sensor data is communicated to the controller in a conventional manner (independent of any synchronization by the controller) or according to the invention (in response to receipt of the trigger signal 24 from the controller 20 at the sensor bidirectional node 16a). Additional programmable features relate to the SENT signal format as described below.

Additional features of the sensor 14a may include an undervoltage/overvoltage lockout circuit 120 and a power-on reset (POR) circuit 124. The undervoltage/overvoltage lockout circuit 120 senses the voltage level of the Vcc signal 25, sending an error signal to the Master Control block 104 if a predetermined range is exceeded (For example, it is these types of faults, along with temperature sensor information that may be read out of an addressed device over the main interface (SENT). In addition, specific registers/EEPROM in the addressed/shared device may also be written to). The POR circuit 124 pauses critical circuitry upon power-up until Vcc reaches an appropriate voltage level.

The sensor 14a may be provided in the form of an integrated circuit, here with an analog front-end portion 140 and a digital subsystem 144. An analog voltage regulator 128 provides a regulated voltage to the analog front-end 140 and a digital regulator 132 powers the digital subsystems 144, as shown. Clock generator 136 provides clock signals to the A/D converter 56 and to the master controller 104. It will be appreciated by those of ordinary skill in the art however, that the particular delineation of which circuit functions are implemented in an analog fashion or with digital circuitry and signals can be varied. Also circuit functions that are shown to be implemented on the integrated circuit sensor 14a can be accomplished on separate circuits (e.g., additional integrated circuits or circuit boards).

Figure 3:
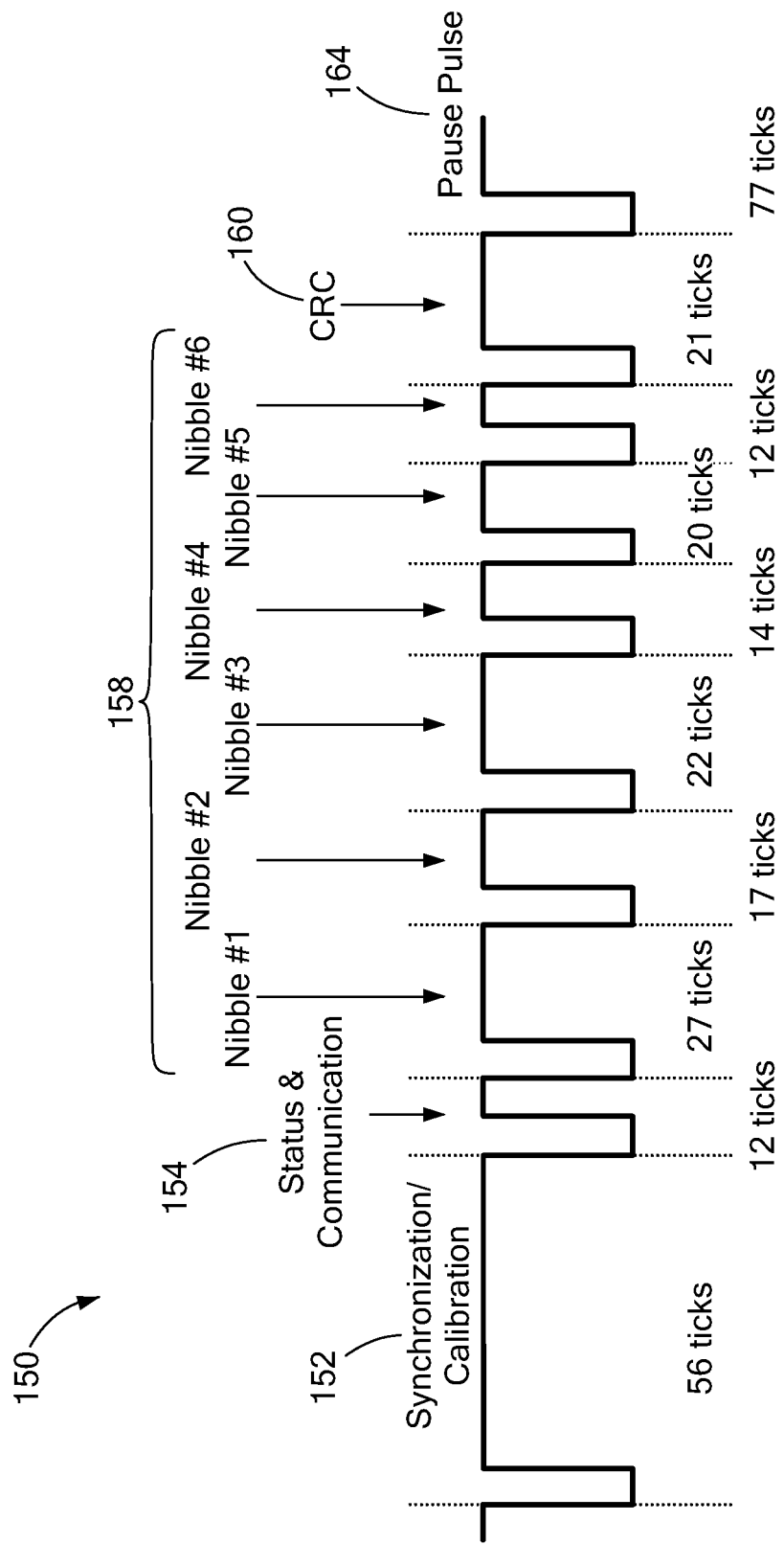
FIG. 3 is a timing diagram showing the SENT signal format.

Referring also to FIG. 3, the serial data signals 26a-26N communicated by the sensor 14a-14N may have a standard unidirectional signal format, such as the illustrative SENT signal format. A SENT signal 150 consists of a sequence of pulses which is repeatedly sent by the transmitting module (here, the sensor 14a). A traditional SENT signal 150 may include at least four portions: a Synchronization/Calibration portion 152, a Status and Serial Communication portion 154, a Data portion 158, and a Checksum (or cyclic redundancy check, CRC) portion 160. A "tick" refers to the nominal clock signal period and a "nibble" is 4 bits. Each nibble has a specified time for low and high state. The low state duration is by default 5 ticks and the high state duration is dictated by the information value of the nibble. The Synchronization/Calibration portion 152 identifies the start of the SENT message and always has a pulse duration of 56 ticks. Status and Serial Communication portion 154 is used to inform the controller 20 of the sensor status or features (such as part numbers or error code information) and has a duration of between 12 and 27 ticks to provide 4 bits. The Data portion 158 includes up to six nibbles of data, with each nibble containing 4 bits with values ranging from 0 to 15. Thus, each data nibble has a pulse duration from 12 to 27 ticks. The number of data nibbles will be fixed for each application but can vary between applications. In order to transmit two 12 bit values, 6 data nibbles are communicated, as shown.

The SENT signal 150 includes an optional pause portion 164 that is used in connection with the invention in order to permit bidirectional communication via the bidirectional sensor node 16a. In general, the pause portion 164 corresponds to a period of inactivity on the output bus, OUT1, (FIG. 1) or in other words, a time when the serial data signal 26a (FIG. 1) is inactive or high. Conventionally, the pause portion 164 is sometimes used to prolong the SENT signal to a constant length if desired. The user can program a particular desired frame rate via the programming scheme as described above. It will be appreciated by those of ordinary skill in the art that inactivity on the output bus, OUT1, may alternatively correspond to a low (pull down) signal level.

According to the invention, the pause portion 164 is used to permit bidirectional communication on the output bus, OUT1, by allowing for the trigger signal 24 received at the sensor bidirectional node 16a during the pause portion to control data functions of the sensor. It will be appreciated by those of ordinary skill in the art that the SENT signal pause portion 164 represents a part of the signal when neither data nor control information is transmitted by the sensor and thus, may be referred to more generally as the inactive transmission portion 164.

Various aspects of the SENT signal format can be user programmed, for example, in the EEPROM 100 of FIG. 2. As examples, a SENT_STATUS parameter can be used to indicate the desired format for the four bit Status and Serial Communication portion 154, a SENT_SERIAL parameter can be used to select a desired format for a serial data signal embedded in successive SENT messages according to the SENT specification, comprising a short serial message format of 8 bits, an enhanced serial message format of 12 bits, or a further enhanced serial message format of 16 bits. A SENT_DATA parameter can be used to specify the particular sensor data to be communicated in the data nibbles. For example, one value of the SENT_DATA parameter may indicate that three data nibbles represent magnetic field data and three data nibbles represent temperature data. A SENT_TICK parameter can used to specify the nominal tick time. A SENT_LOVAR parameter can be used to depart from the SENT standard of having a fixed low state time in each nibble to having the high state time fixed instead. And a SENT_FIXED parameter can be used to depart from the SENT standard by specifying a different defined length of the fixed portion of each nibble.

A SENT_UPDATE parameter is used to specify a desired data communication mode. In one mode of data communication, sensor data is stored in response to detection of a first feature of the trigger signal 24 and is communicated in response to a detection of second feature of the trigger signal 24 (see, for example, FIG. 5). In other examples, sensor data is both stored and communicated to the controller 20 (FIG. 1) in response to detection of a single feature of the trigger signal 24. Other data communication modes are also possible, such as a mode in which the trigger signal controls only generating/updating the sensor data (such as via the A/D converter 56 of FIG. 2), a mode in which the trigger signal only controls communication of the serial data signals 26a-26N and any sensor data generating/updating and/or dedicated sensor data storage occurs independently of the trigger signal, a mode in which the trigger signal resets certain sensor circuitry (such as clock generator 136, registers, or counters) such as a mode in which any combination of these sensor functions is controlled by the trigger signal, or a mode in which the serial data signal 26a does not include the optional pause portion 164. For example, the trigger signal may, alternatively, control only one such function (data sampling, storing or communication) or any combination of sensor data storing, updating, resetting and transmitting functions.

Referring also to FIG. 4, in one mode of data communication, sensor data is stored in response to detection of a trigger signal received at the sensor bidirectional node and is communicated to the controller. FIG. 4 shows a signal transmission 171 from the controller 20 to the sensors 14a-14N for the sensor system 10 (FIG. 1). Each sensor 14a-14N is responsive to a first feature 210, shown in FIG. 4 as a falling edge, of a received trigger signal 96 for storing sensor data and to a second feature 214, shown in FIG. 4 as a rising edge, of the received trigger signal for transmitting the stored sensor data in a serial data signal. The first feature 210 may be used by sensors (e.g., linear and angle sensors) as a trigger mechanism to multiple devices to trigger the sampling of data by the sensors.

The sensors 14a-14N detect the first feature 210a of the trigger signal, here a falling edge, samples and stores their respective sensor data in the latch 86 in response. The sensors 14a-14N further detect the second feature 214a of the trigger signal, here a rising edge. Each sensor 14a-14N responds in turn (sequentially) based on a previously configured order. In one particular example, sensor 14a sends a SENT message 224a; after sensor 14a sends the SENT message 224a, the sensor 14b sends a SENT message 224b; and so forth with the sensor 14N sending the last SENT message 224N.

The first sensor in the previously configured order would respond with a serial data signal while the remaining sensors start monitoring the serial data signals from the other sensors to determine when it may send its message. In one example, the previously configured order would be stored in the EEPROM or another type of non-volatile device. In one example, in the event that a next sensor determines that there is no message within a specified amount of time coming from the previous sensor in the previously configured order, the next sensor responds with its serial data signal and a notification that it did not detect the message from the previous sensor. In one example, each sensor may report its identification (address or identifier bit stream) in its Status Nibble. In other examples, based on an address of a particular device the sensor could provide more than just Hall magnetic field data. The sensor could, for example, further provide temperature sensor data or error flag status if in a read mode command.

In other examples, the sensors 14a-14N would listen to the messages sent by the other sensors. For example, the sensors may compare their output values and register a plausibility error if the sensor's values should be matched. In other examples, other information may be compared such as temperature values between sensors.

While the trigger signal features used in this embodiment are signal edges of a particular direction, various other signal features would alternatively be used, including but not limited to one or more signal pulses (i.e., detection of first and second, opposite edge directions), multiple edge detections of the same or different directions and so forth.

In other examples, a trigger signal from the controller 20 does not necessitate a response from the sensor components 14a-14N that includes data. In one example, no response is required. In another example, the sensor components 14a-14N may send a response that does not include data; but rather, the response is, for example, an acknowledgment signal that indicates that the trigger signal was received by the sensor.

In one particular example, a trigger signal may include a number of toggling pulses issued from the controller where the pulses are separated by a small number of ticks. In another particular example, a trigger signal may be used that includes an address not used by the sensors 14a-14N. In one particular example, sensors have addresses 00, 01 and 10; and 11 is used as a trigger signal. For example, the trigger signal would instruct all devices to sample the magnetic field level at this specific time.

Referring to FIG. 5A, if the trigger signal instructs the sensors 14a-14N to store their data but not send the data to the controller 20, then an additional trigger signal is used to retrieve the data. In particular, a second trigger signal may be directed at one specific sensor or a subset of the sensors 14a-14N. For example, the second trigger signal may be a Manchester encoded signal. The sensors 14a-14N receiving signals from the communication node 21 will listen to the encoded signal and if a sensor recognizes that it is being addressed sends its data. For example, the sensor sends a serial data signal. FIG. 5A depicts one particular example, where two zeroes are transmitted in a row followed by a 2-bit sensor address flowed by a portion to allow the sensor response.

Referring to FIG. 5B, in another particular example, the address bits may be extended from just 2 bits to, for example, 8 bits, to address internal registers in a sensor device. For example, the first 2 bits of the Address field could be for addressing the particular slave device, the next 2 bits bit could be used to indicate a coded Read/Write message, and then the remaining 4 bits could be used for addressing an internal register/EEPROM in the device.

Figures 6A, 6B:
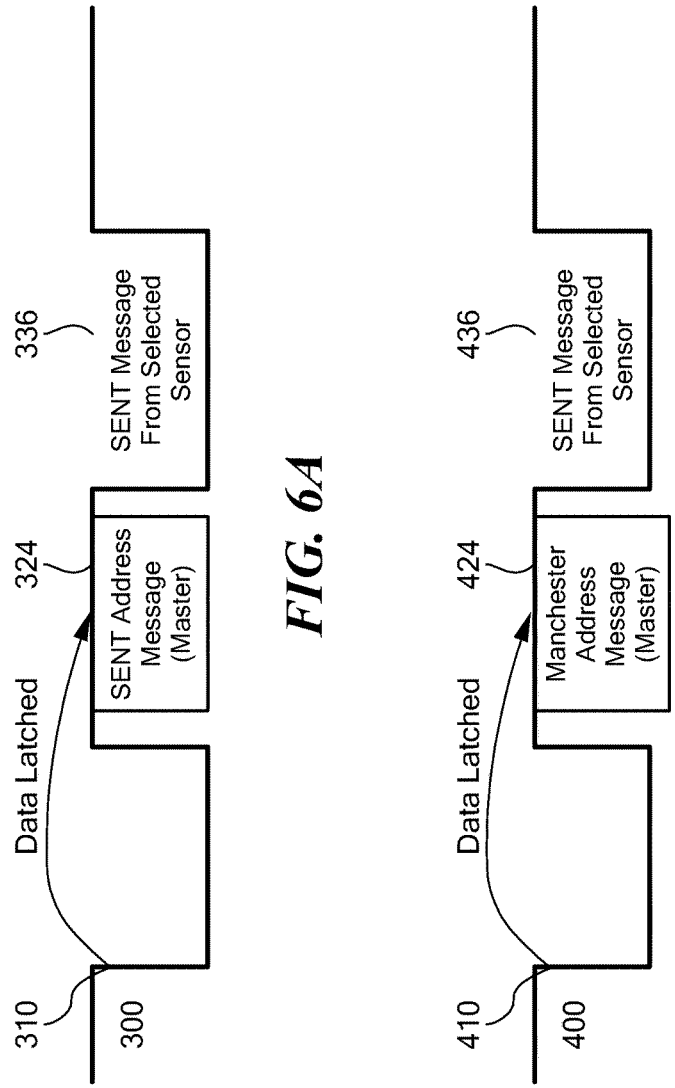
FIG. 6A is a timing diagram of an example of a first trigger signal to store data at a sensor and a second trigger signal used to retrieve the data from the sensor using the communication node.
FIG. 6B is a timing diagram of an example of a first trigger signal to store data at a sensor and a second trigger signal used to retrieve the data from the sensor using the communication node.

Referring to FIG. 6A, in another example of retrieving data from the sensors 14a-14N, a serial data signal message may be sent from the controller 20 to the sensors 14a-14N but intended for one of the sensors. For example, the serial data signal may be a SENT message as described in FIG. 3. The selected sensor would interpret the SENT message in the same manner the controller 20 would. FIG. 6A depicts a transmission signal 300 that includes a falling edge 310 which signals the sensors 14a-14N to store their data. The controller 20 sends a SENT message 324 that triggers one of the sensors 14a-14N to respond by sending its data in a SENT message 336. For example, the SENT message is the SENT signal 150 described in FIG. 3 that includes fifty-six ticks for synchronization followed by one or more Nibbles. In one example, the SENT message 324 from the controller 20 includes an address of the desired sensor to respond. For example, a Nibble may include a 4-bit address. In one example, the SENT message 324 may include a cyclic redundancy check (CRC).

Referring to FIG. 6B, in another example, a transmission signal 400 that includes a falling edge 410 which signals the sensors 14a-14N to store their data. The controller 20 sends a Manchester message 424 (e.g., such as described in FIGS. 5A and 5B) that triggers one of the sensors 14a-14N to respond by sending its data in a SENT message 436.

Figure 7:
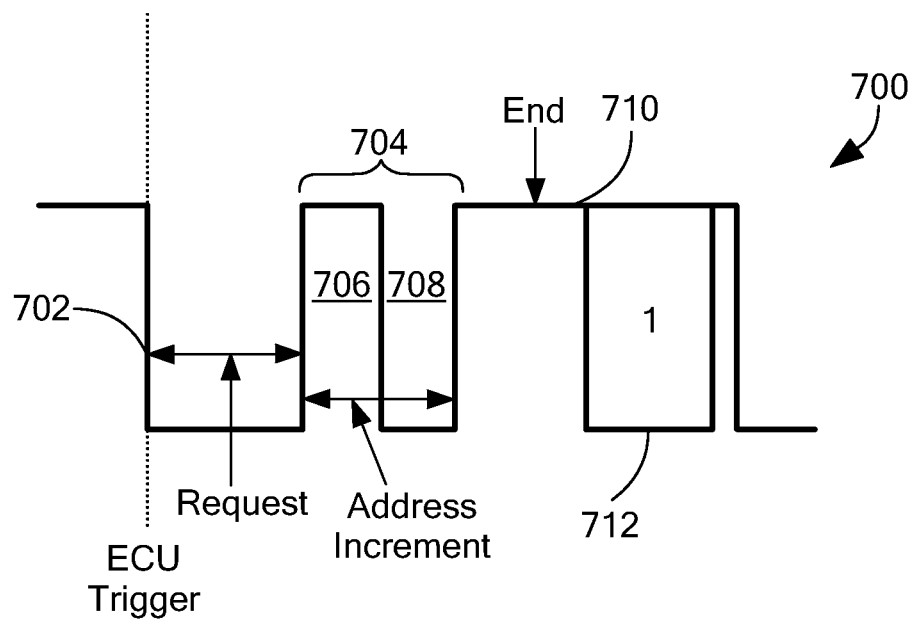
FIG. 7 is a timing diagram of a transmission between a master and slave on a communication node that includes addresses.

Referring to FIG. 7, serial data communication 700 between controller 20 acting as a master and a sensor acting as a slave may be transmitted in accordance with a point-to-point (i.e. single master and single slave) protocol, such as the SENT protocol. In this example, the sensor may have address "1" and be configured to respond to communications from controller 20 that include address "1". For clarity, the sensor with address 1 may be referred to as "sensor 1," the sensor with address 2 as "sensor 2," etc.

The controller 20 sends a command to a slave device, in this example a sensor. The command may include a request pulse and an address, requesting that the sensor with the matching address send its data to controller 20. The command may begin with controller 20 sending a request pulse 702 onto the bus (e.g. onto bidirectional nodes 16a-16N). Following request pulse 702, controller 20 may send an address 704 that identifies one or more of the sensors on the bus. The address may be a series of toggling pulses that identify a sensor or, in another embodiment, the address may be a single pulse having a duration that corresponds to one of the sensors. In the former case, each sensor is associated with a unique count value of pulses and/or pulse edges or transitions and the sensor associated with the number of pulses and/or pulse edges of the transmitted address may respond to controller 20. In the latter case, each sensor is associated with a unique duration and the sensor associated with the duration of the transmitted address pulse may respond to controller 20.

In the example shown in FIG. 7, controller 20 sends a single high pulse 706 and a single low pulse 708 to indicate it is requesting a response from the sensor with the address "1." The address 704 is followed by an end signal 710 indicating the end of the message. To generate end signal 710, controller 20 may hold the voltage on the bus high (or alternatively low) for a predetermined period of time that is greater than the duration of an address pulse (e.g. a duration greater than that of address pulse 706 or 708).

After receiving request 702, each of the sensors may count the number of toggle pulses within address 704. Alternatively, each sensor may count the number of falling and/or rising edges of address signal 704. When the sensors receive end signal 710, each sensor may determine whether the address (i.e. the count) matches its own address. The sensor with the matching address may then respond to the request by sending data 712 to the controller.

Figure 8:
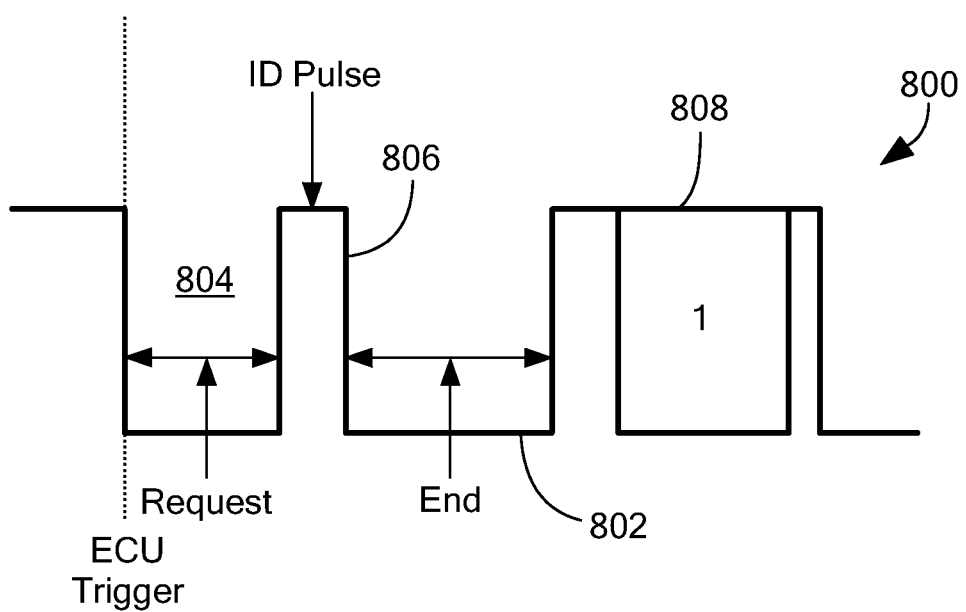
FIG. 8 is a timing diagram of another transmission between a master and slave on a communication node that includes addresses.

In FIG. 8, serial data communication 800 includes an end signal 802 that is pulled low on the bus. Similarly to FIG. 7, controller 20 may send a request signal 804 followed by an address signal 806. Address signal 806 may include a series of toggling pulses indicating an address of one or more of the sensors. Following address signal 806 is end signal 802. In this example, to generate end signal 802, controller 20 pulls the bus low for a predetermined period of time. The duration of the end signal may be longer than the duration of the pulses of address signal 806 to differentiate the end signal from one of the address pulses. Because end signal 802 is pulled low, only one pulse is needed in address signal 806 to indicate the address of "1". If controller 20 were addressing the sensor with address "3", for example, then controller 20 may send three pulses onto the bus.

After receiving request 804, each of the sensors may count the number of toggle pulses within address signal 806. Alternatively, each sensor may count the number of falling and/or rising edges of address signal 806. When the sensors receive end signal 802, each sensor may determine whether the address matches its own address. The sensor with the matching address may then respond to the request by sending data 808 to the controller.

Figure 9:
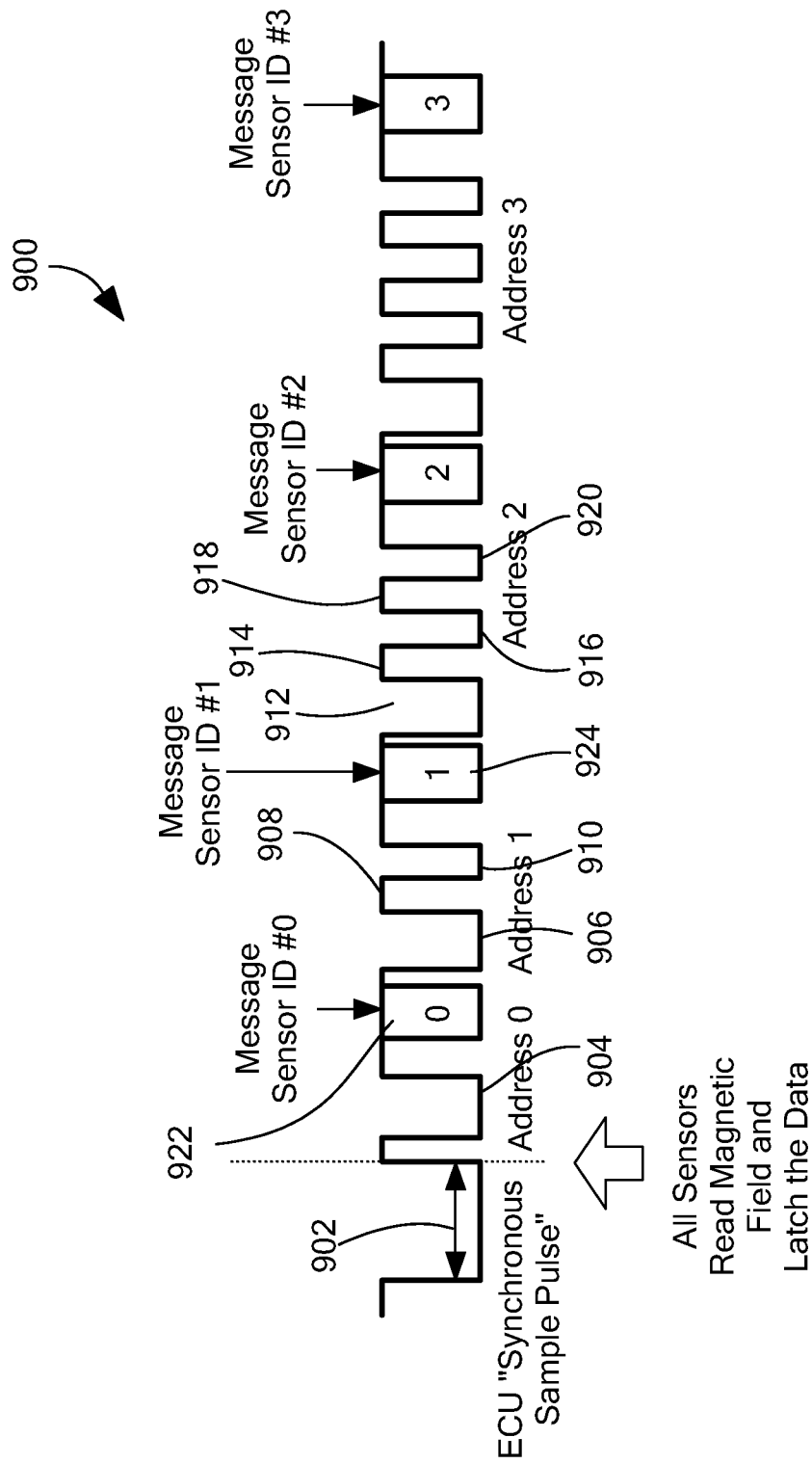
FIG. 9 is a timing diagram of a transmission sequence, including a sample pulse/command, between a master and multiples slaves on a communication node.

Referring now to FIG. 9, a transmission sequence 900 may include a series of requests from controller 20 for data from sensors 14a-14N. Transmission sequence 900 may begin with a sample pulse 902, which may be a broadcast message (i.e. a message or command that is sent to all the slave devices on the bus). Sample pulse 902 may act as a command instructing any or all sensors 14a-14N to perform a measurement. Synchronous sample pulse 902 may be a pulse that is pulled low, or alternatively pulled high, and may have a predetermined or known duration in ticks. When received by sensors 14a-14N, the pulse may act as a command that causes sensors 14a-14N to sense and record the characteristic (e.g. the magnetic field) of the article, as described above. The sensors may then store the measurement in an internal memory or register for later transmission.

After sample pulse 902, controller 20 may request the sensors send the measurement to controller 20. In the example shown, after sample pulse 902 is sent, controller 20 sends a request pulse 904 onto bidirectional nodes 16a-16N. To send request pulse 904, controller 20 may pull the voltage on bidirectional nodes 16a-16N low (or alternatively high) for a predetermined amount of time.

Following each request pulse, controller 20 may send an address to indicate which sensor should reply by sending its measurement. The address may be a series of toggling pulses on the bus. For example, address "1", following request pulse 906, may comprise one toggle: one high pulse 908 followed by one low pulse 910. The address "2", following request pulse 912, may comprise two toggles: a high pulse 914, followed by a low pulse 916, followed by another high pulse 918, followed by another low pulse 920. The address "3" may comprise three toggles, the address "4" may comprise 4 toggles, and so on. Each of these toggle pulses may have a predetermined duration. After the address is sent, controller 20 may send an end signal, as described above. The address "0" may comprise zero toggles, as shown by the lack of toggles following sample pulse 904. In this case, sample pulse 904 may be followed immediately by an end signal, such as end signal 710 and 802 in FIGS. 7 and 8.

Each sensor may receive the request pulses, addresses, and end signal and determine whether the address matches its own address. The sensor with the matching address may respond to the request by sending data onto the bus to be received by controller 20. For example, as shown in FIG. 9, after address 0 is sent, sensor 0 responds by sending data 922 onto the bus; after address 1 is sent, sensor 1 responds by sending data 924 onto the bus; and so on.

Although the addresses sent from controller 20 are shown in ascending order (i.e. address "1", then address "2", then address "3", etc.), controller 20 may address the sensors in any desired order. Regardless of the order, the sensor with the matching address may respond. In another embodiment, a predetermined order of addresses may be required.

Figure 10:
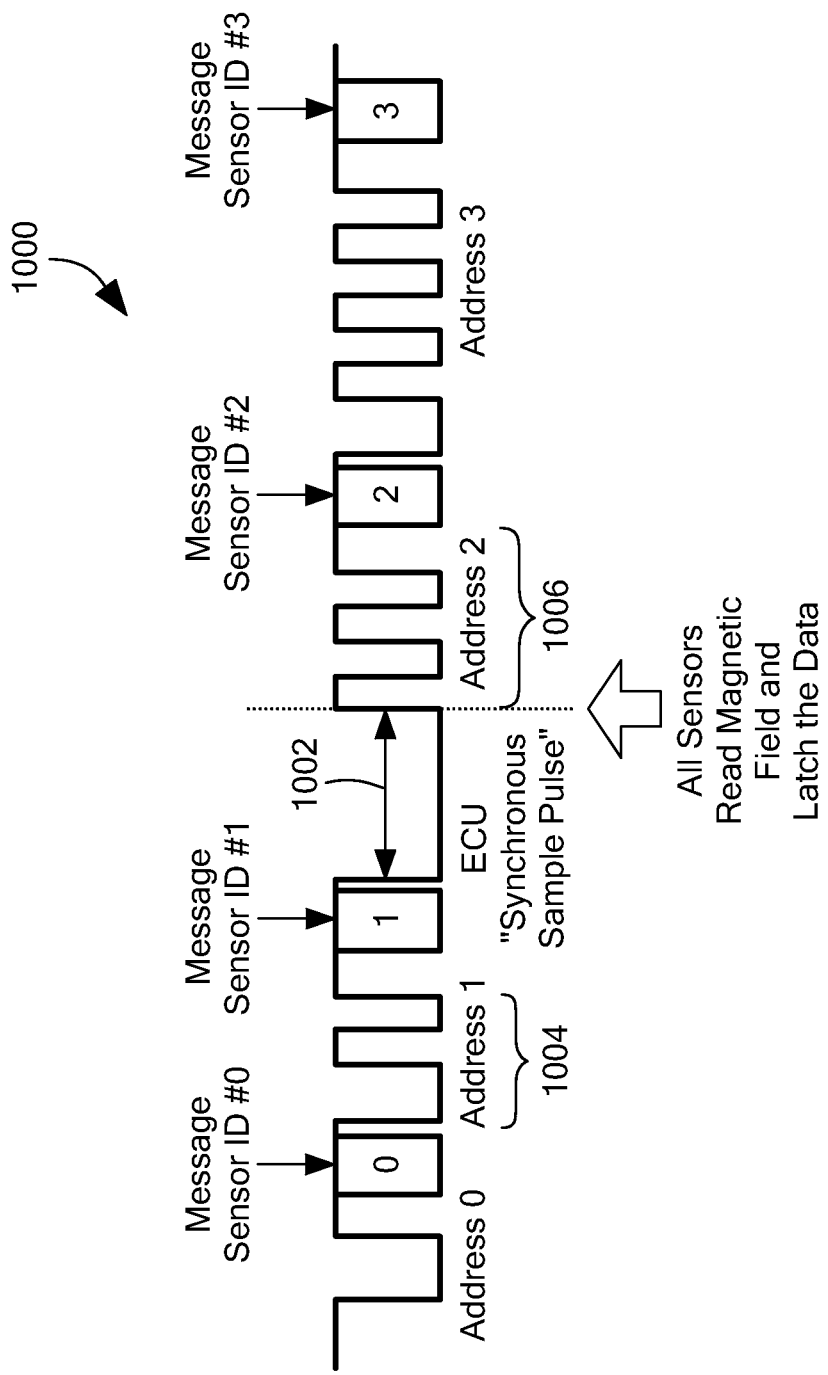
FIG. 10 is a timing diagram of another transmission sequence, including a sample pulse/command, between a master and multiples slaves on a communication node.

Similarly, in an embodiment, the sample pulse 902 need not appear at the beginning of the transmission sequence. Referring to FIG. 10, similar to transmission sequence 900, a transmission sequence 1000 may include a series of requests from controller 20 for data from sensors 14a-14N. As shown, controller 20 sends a sample pulse 1002 between command 1004 and command 1006. Sample pulse 1002 may instruct all the sensors to take a measurement, as described above. After sample pulse 1002 is sent, controller 20 may continue sending requests for data to the sensors.

In an embodiment, sample pulse 1002 may replace the request pulse (e.g. request pulse 702 in FIG. 7) that controller 20 would otherwise send in order to request data from the sensor. Replacing the request pulse with the sample pulse, rather than sending a sample pulse followed by a request pulse, can decrease communication time on the bus.

In another embodiment, appending the sample pulse 1002 with an address may instruct only the sensor with a matching address to make a measurement. In this case, sampled pulse 1002 followed by address 2 may cause only the sensor with address 2 to perform a measurement.

Figure 11:
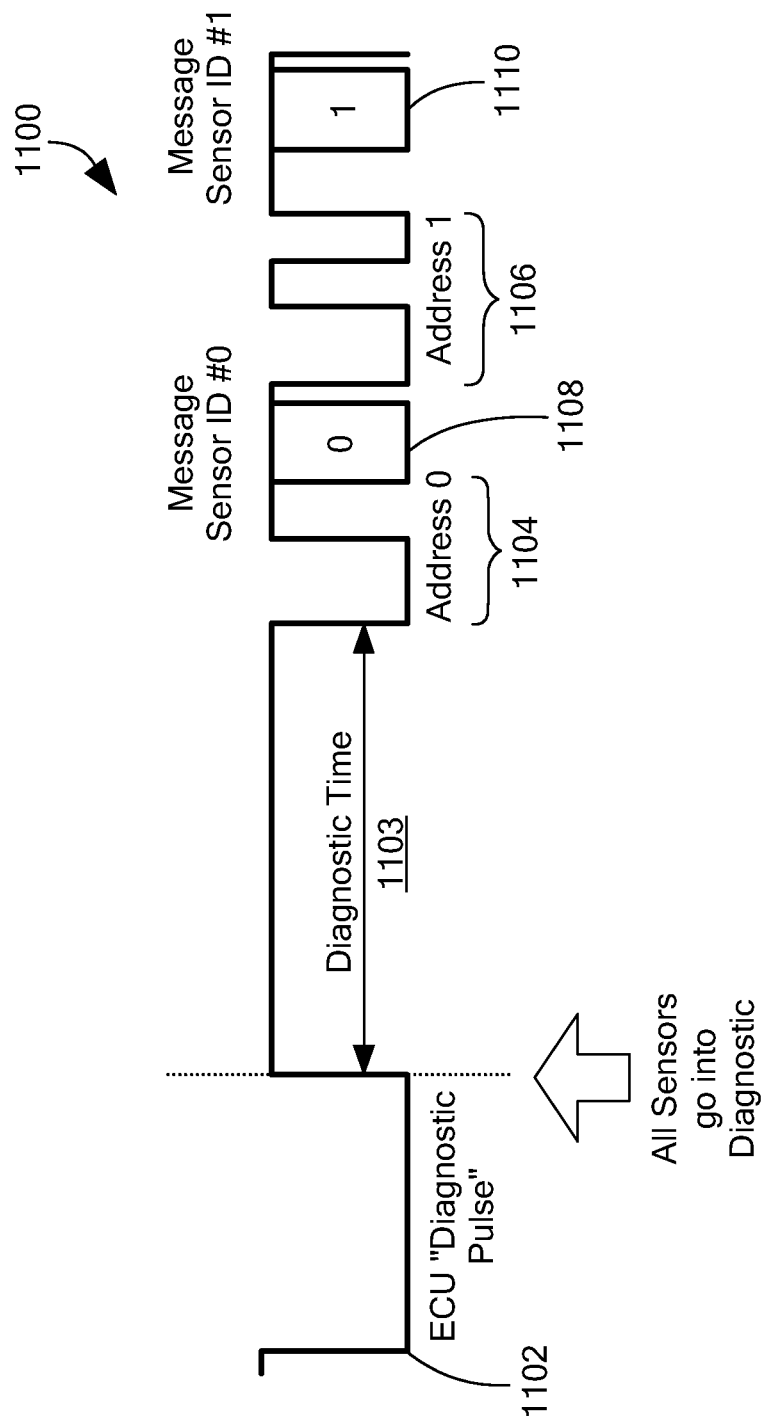
FIG. 11 is a timing diagram of a transmission sequence, including a diagnostic pulse/command, between a master and multiples slaves on a communication node.

Referring now to FIG. 11, controller 20 may send a diagnostic command to the sensors instructing the sensors to initiate self-tests (also referred to as self-diagnostic tests). In an embodiment, the diagnostic command comprises diagnostic pulse 1102. Controller 20 may transmit diagnostic pulse 1102 by holding the bus low (or alternatively high) for a predetermined duration. The duration of diagnostic pulse 1102 may be different from the duration of sample pulse 902 to differentiate the types of pulses or other types of messages or commands. When the sensors receive diagnostic pulse 1102, each sensor may perform self-diagnostic tests to determine whether the sensor is operating properly. To allow the sensors enough time to perform diagnostic tests, diagnostic pulse 1102 may be followed by diagnostic time 1103, where controller 20 does not send any additional requests. The duration of diagnostic time 1103 may be a predetermined time sufficient to allow the sensors to perform and complete their diagnostic tests. Sending diagnostic pulse 1102 followed by diagnostic time 1103, rather than followed by an address of a specific sensor, may indicate that all sensors on the bus should perform self-diagnostic tests.

Following diagnostic time 1103, controller 20 may send commands to the sensors (e.g. command 1104 addressed to the sensor with address "0" and command 1106 addressed to the sensor with address "1"). The addressed sensors may respond by transmitting data (e.g. data transmission 1108 and data transmission 1110) to controller 20. In an embodiment, the data transmissions 1108 and 1110 sent by the sensors after receiving diagnostic request 1102 may include the results of the diagnostic tests. Upon receipt of these results, controller 20 may determine which sensors have passed and which have failed their diagnostic tests. If any sensors have failed the test, controller 20 can raise an alarm or alert. For example, in an automotive environment where one or more of the sensors is coupled to an automotive system such as an anti-lock braking system ("ABS"), controller 20 may send an alarm to the automobile's computer which can then disable the ABS, initiate a warning to the driver, or take any other appropriate action.

Sending diagnostic pulse 1102 followed by diagnostic time 1103, rather than followed by an address of a specific sensor, may indicate that all sensors on the bus should perform self-diagnostic tests. In contrast, sending a diagnostic pulse followed by an address may indicate that only the sensor with the matching address should perform self-diagnostic tests.

Figure 12:
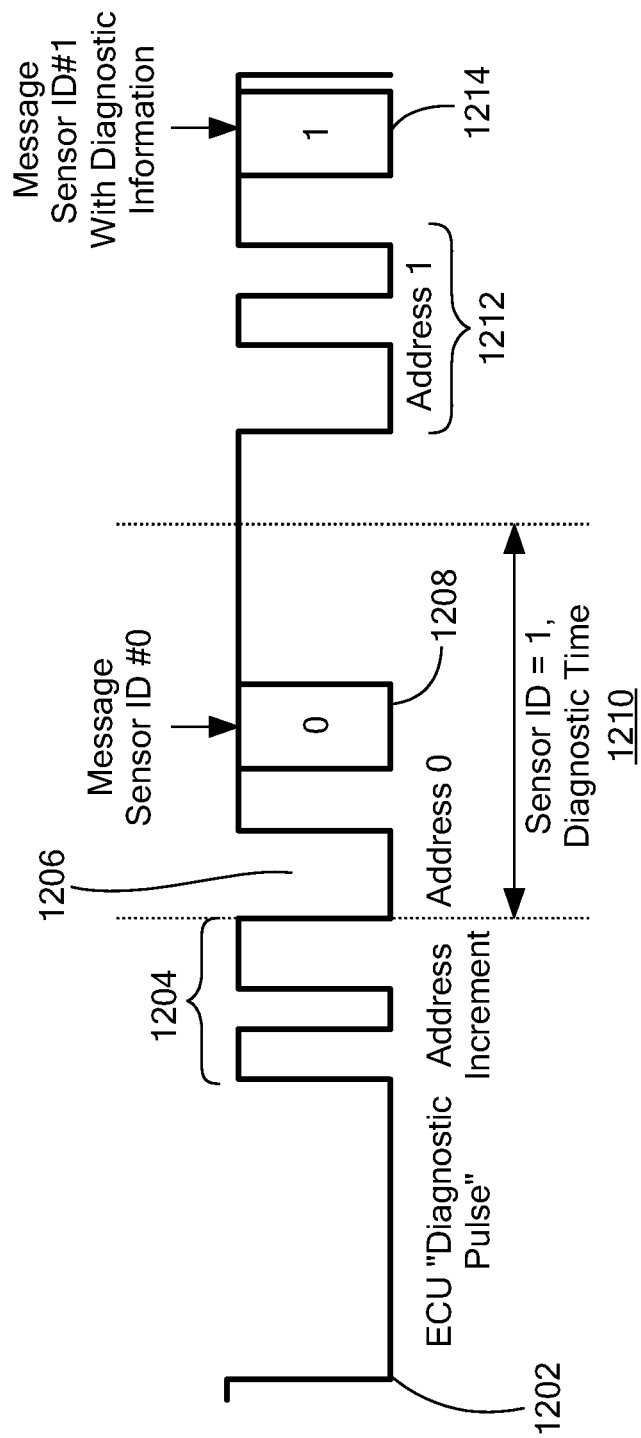
FIG. 12 is a timing diagram of another transmission sequence, including a diagnostic pulse/command, between a master and multiples slaves on a communication node.

Referring to FIG. 12, diagnostic pulse 1202 may be followed by an address 1204. In an embodiment, when the diagnostic pulse and address are received by the sensors, only the sensor with the matching address will initiate self-diagnostic tests. In the example shown, address 1204 is the address "1". Thus, when diagnostic pulse 1202 and address 1204 are received, the sensor with address "1" will perform self-diagnostic tests while the other sensors continue to operate normally.

While the sensor 1 is performing diagnostic tests, controller 20 may send one or more requests to the other sensors, such as request pulse 1206 sent to the sensor with address "0". The sensor with the matching address may respond with data transmission 1208 (which may include measurement data or other requested data). After diagnostic time 1210 has elapsed, controller 20 may send command 1212 to sensor 1, and the sensor may respond by sending data 1214 with the results of its diagnostic tests to controller 20. In an embodiment, after a sensor receives a diagnostic pulse 1102 or 1202, the next data sent by the sensor will include its self-diagnostic test results.

Referring to FIG. 13, controller 20 may send requests without addresses to the sensors. In such an embodiment, the sensors may each have an address, and may respond to a command in the sequence if the position of the command within the sequence matches the sensor's address. In transmission sequence 1300, controller sends a series of trigger pulses 1302a-1302N. After each trigger pulse, a sensor responds in a predetermined order. For example, after the first trigger pulse 1302a, the sensor with address 1 responds by sending data 1304a, after the second trigger pulse 1302b, the sensor with address 2 responds by sending data 1304b, and so on. After all the sensors have sent their data, the sequence may repeat.

In an embodiment, each sensor has knowledge (e.g. data stored in a memory or register) of how many sensors are operating on the bus. Each sensor may also include a counter to count the number of trigger pulses sent by controller 20. After each trigger pulse 1302a-1302N, the sensors may increment their counter to keep track of the number of trigger pulses sent. If a sensor receives a trigger pulse 1302a-1302N, and the sensor's counter matches the sensor's address, that sensor may respond to the trigger pulse by sending its data to controller 20. Thus, the sensors may respond to requests from the controller 20 in a round-robin manner.

Each of the sensors' counters may be configured to reset when the count reaches or exceeds the number of sensors that are active on the bus. After all the sensors on the bus have responded to requests, the counters reset and the sequence begins again starting with a response from the sensor with address 1.

Referring to FIG. 14, controller 20 can send a reset command 1402 instructing all the sensors to reset their counters. The reset command 1402 may be a pulse (high or low) on the bus having a predetermined duration. In the example of FIG. 14, after the sensor with address 2 sends data 1404, the reset signal 1402 appears on the bus and all the sensors' counters are reset so that the sequence restarts from the beginning Thus, in response to the next trigger pulse 1406 sent by controller 20, the first sensor in the sequence (i.e. sensor 1) responds by sending data 1408 to controller 20. After the next trigger pulse, the next sensor in the sequence (i.e. sensor 2) sends data, and so on.

Figure 15:
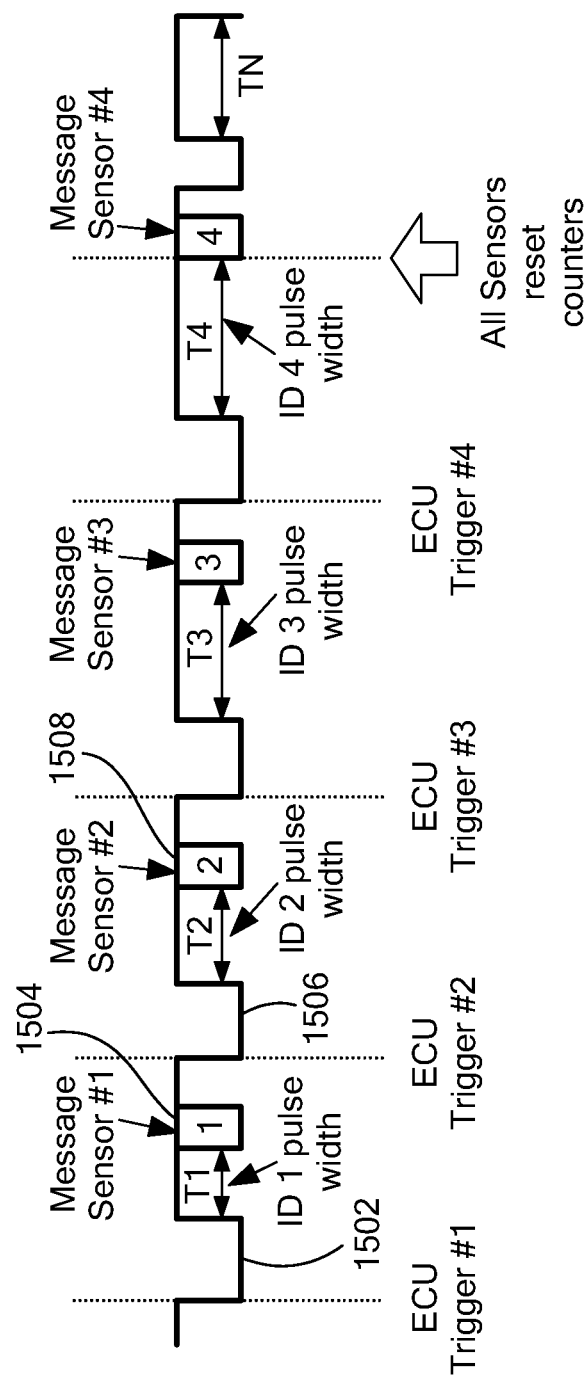
FIG. 15 is a timing diagram of another transmission sequence, including a predetermined sequence of replies with reply delay times, between a master and multiples slaves on a communication node.

Referring to FIG. 15, the sensors may be configured to delay sending their response by a predetermined time corresponding to the address of the sensor. For example, in response to the first trigger pulse 1502, the sensor with address 1 may delay for time T1 before sending response 1504. Similarly, in response to the second trigger pulse 1506, the sensor with address 2 may delay for a time T2 before sending response 1508. Likewise, the sensor with address 3 may delay by a time T3, the sensor with address 4 may delay by a time T4, etc. Each delay time (also referred to as a delay time period) T1-TN may have a unique duration that can be used by controller 20 and/or the sensors to identify the sensor that sent the response. For example, if one sensor fails to respond to a request, controller 20 can identify the source of the subsequent response and determine that the sequence has fallen out of order. The controller may then reset the sensors (as described above), generate an error message, or take any other appropriate action.

Additionally or alternatively, if, for example, a sensor is not observing the bus for some time or does not receive or does not process one or more trigger pulses sent by controller 20 it may lose count of the sequence. In this situation, the sensor may read the delay time from the other sensors' responses to determine which sensor is currently responding to controller 20. Based on the current response, the sensor may determine when it should respond to controller 20. Assume, for example, that sensor 6 was not able to observe one or more trigger pulses from controller 20 due to interference and lost its count. Assume also that controller 20 sends a trigger pulse and that sensor 3 responds. Sensor 6 may observe sensor 3's response, read the delay time, and based on the delay time, determine that sensor 3 just responded. Sensor 6 may then reset its counter to 3 so that it has a proper count of the sequence, and so that it can respond to the sixth trigger pulse in the sequence when the time comes. This may eliminate or reduce the need for controller 20 to reset the sensors if one or more sensors lose their place in the sequence.

Figure 16:
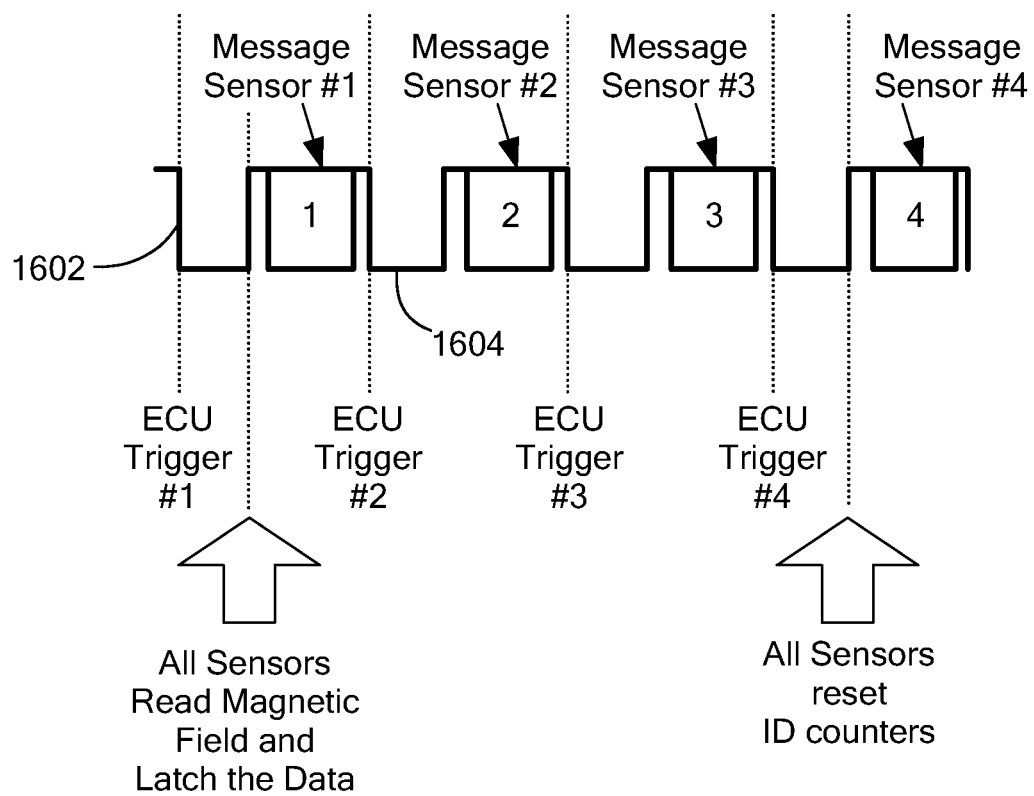
FIG. 16 is a timing diagram of another transmission sequence, including a predetermined sequence of replies, between a master and multiples slaves on a communication node.

Referring to FIG. 16, the sensors may be configured to take a measurement at a predetermined point within the sequence. In an embodiment, after the sequence starts or restarts and controller 20 sends the first trigger pulse 1602 in the sequence, all the sensors on the bus may perform a measurement (as described above). The sensors may be configured to take a measurement at any point during the sequence, for example, at the end of the sequence, at a point in the middle of the sequence, etc.

In another embodiment, each sensor may be configured to take a measurement at a different point in the sequence. The sensor with address 2, for example, may be configured to take a measurement after the first trigger 1602 so that, by the time the second trigger 1604 is received, the sensor with address 2 has newly sampled data it can send to controller 20. Similarly, the sensor with address 3 may be configured to take a measurement after the second trigger, the sensor with address 4 after the third trigger, etc.

Figure 17:
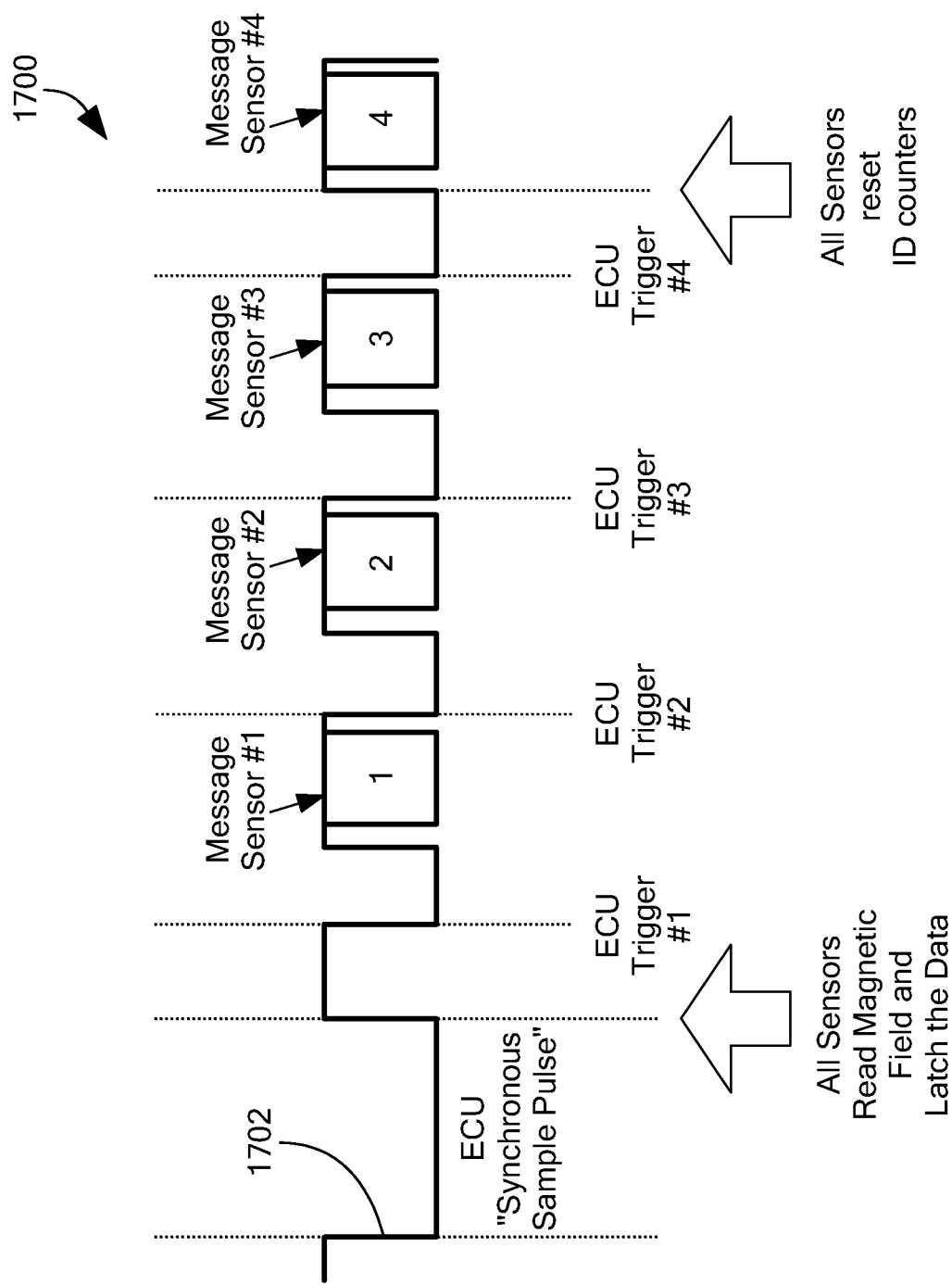
FIG. 17 is a timing diagram of another transmission sequence, including a predetermined sequence of replies and a sample pulse/command, between a master and multiples slaves on a communication node.

Referring now to FIG. 17, in another embodiment, controller 20 may send a synchronous sample pulse 1702 to the sensors at the beginning of the sequence 1700. Synchronous sample pulse 1702 may be a command which, when received by the sensors, may instruct all the sensors to make a measurement, as described above. To send synchronous sample pulse 1702, controller 20 may hold the bus low (or alternatively high) for a predetermined amount of time. The duration of synchronous sample pulse 1702 may be different from that of the reset pulses described above so that the sensors can differentiate the different types of pulses.

Figure 18:
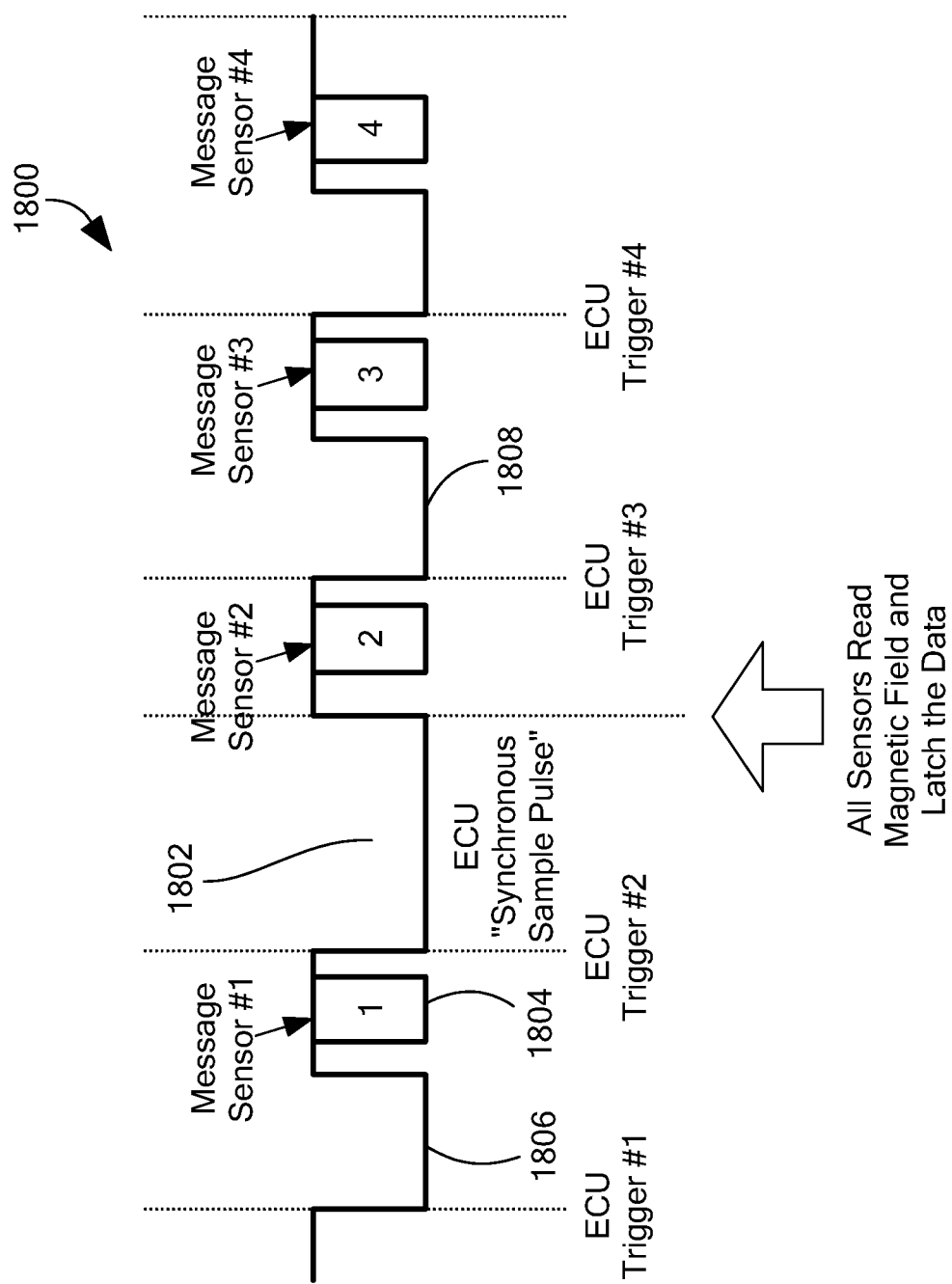
FIG. 18 is a timing diagram of another transmission sequence, including a predetermined sequence of replies and a sample pulse/command, between a master and multiples slaves on a communication node.

Referring to FIG. 18, the synchronous sample pulse need not appear at the beginning of the sequence, and can be inserted between any trigger pulse sent by the controller and/or response sent by a sensor. As shown in FIG. 18, controller 20 may insert a synchronous sample pulse 1802 after a response 1804 from the sensor with address 1. Controller 20 may also insert a synchronous sample pulse at any point in the sequence.

In an embodiment, synchronous sample pulse 1802 can replace a trigger pulse, such as trigger pulse 1806 or 1808 for example. In FIG. 18, synchronous sample pulse 1802 has replaced the trigger pulse that would otherwise appear in the second position in sequence 1800. In this example, synchronous trigger pulse 1802 may perform two functions—it may act as a synchronous trigger pulse causing all the sensors on the bus to take a measurement, and also act as a trigger instructing the next sensor in the sequence to send its data to controller 20. In embodiments, synchronous sample pulse 1802 can be used to replace any trigger pulse in the sequence.

Figure 19:
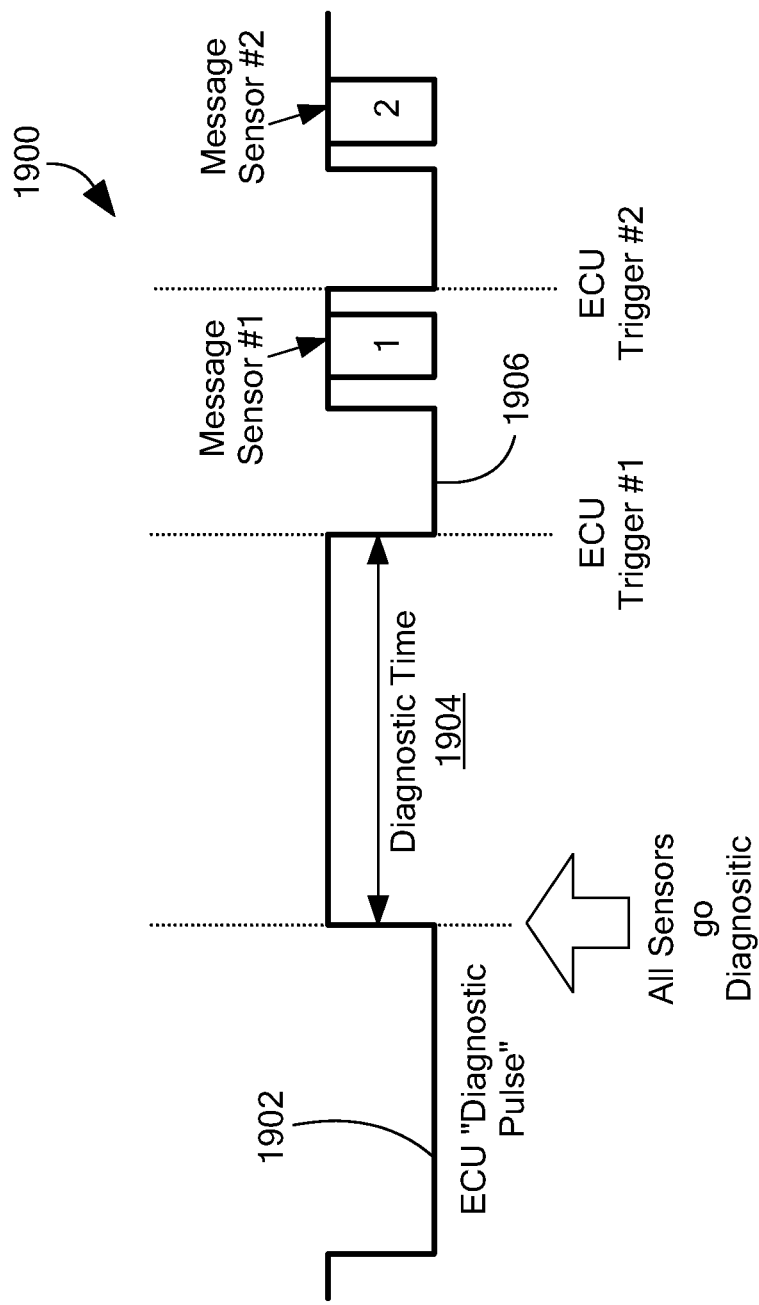
FIG. 19 is a timing diagram of another transmission sequence, including a predetermined sequence of replies and a diagnostic pulse/command, between a master and multiples slaves on a communication node.

Referring now to FIG. 19, a transmission sequence 1900 includes a diagnostic pulse 1902. Controller 20 may transmit diagnostic pulse 1102 by holding the bus low (or alternatively high) for a predetermined duration. The duration of diagnostic pulse 1102 may be different from the duration of synchronous sample pulse 1702 and reset pulse 1402 to differentiate the type of pulses. Diagnostic pulse 1902 may be a command which, when received by the sensors, instructs each sensor to perform self-diagnostic tests to determine whether the sensor is operating properly. To allow the sensors enough time to perform diagnostic tests, diagnostic pulse 1902 may be followed by diagnostic time 1904, during which time controller 20 does not send any additional requests. The duration of diagnostic time 1904 may be a predetermined time sufficient to allow the sensors to perform and complete their diagnostic tests.

Following diagnostic time 1904, controller 20 may begin sending trigger pulses (e.g. trigger pulse 1906) to the sensors, which may respond by sending data to controller 20 if the position of the trigger pulse within sequence 1900 matches the address of the sensor, as described above. After receiving diagnostic pulse 1902, the next data transmission sent by each sensor may include the results of the self-diagnostic test performed by the sensor.

In some embodiments, controller 20 may send diagnostic pulse 1902 at the beginning of sequence 1900. In this case, the diagnostic pulse may also act as a reset command; when the sensors receive the diagnostic pulse they may reset their counters so that the transmission sequence starts anew. In other embodiments, controller 20 may send a diagnostic pulse in the middle of the transmission sequence.

Figure 20:
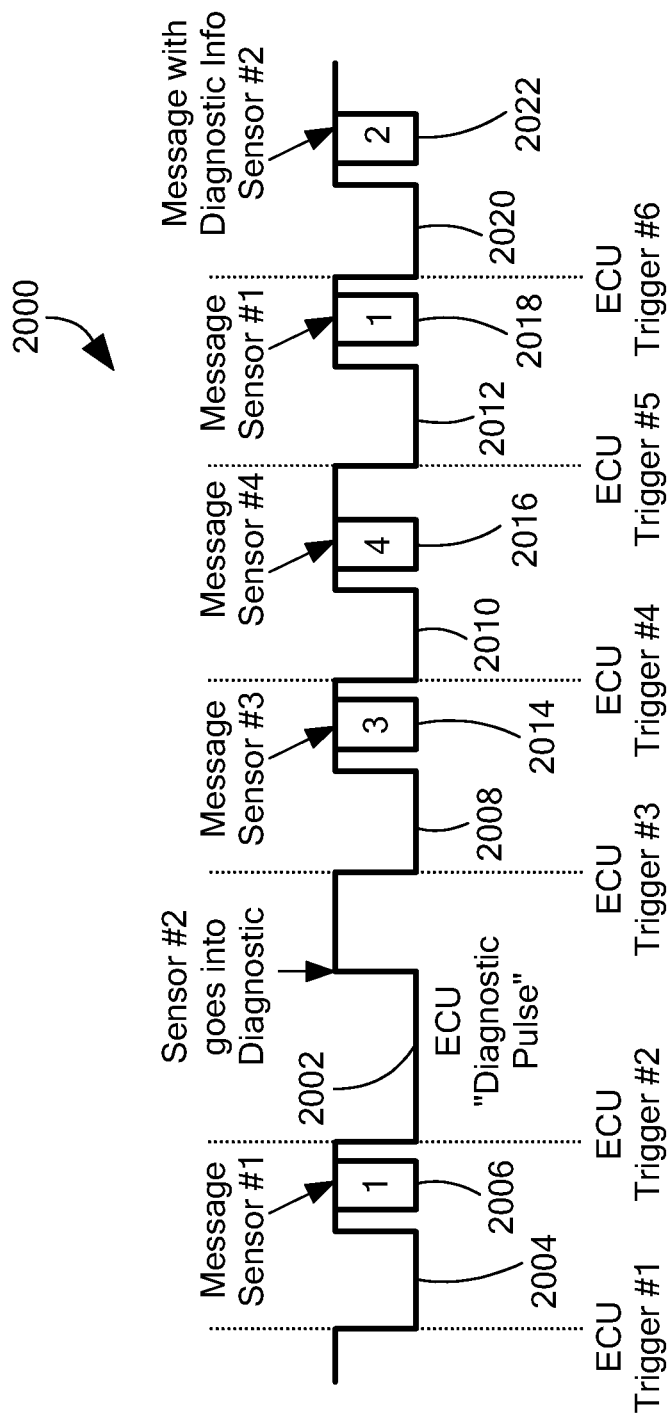
FIG. 20 is a timing diagram of another transmission sequence, including a predetermined sequence of replies and a diagnostic pulse/command, between a master and multiples slaves on a communication node.

Referring to FIG. 20, transmission sequence 2000 provides an example of controller 20 sending a diagnostic pulse 2002 in the middle of the transmission sequence. In this example, the diagnostic pulse 2002 may be used to instruct a single sensor to perform self-diagnostic tests. Controller 20 sends a trigger pulse 2004 and receives data 2006 from sensor 1. Following data 2006, controller 20 sends diagnostic pulse 2002 in place of the trigger pulse that would otherwise follow data 2006. Because diagnostic pulse 2002 appears in the second position of the sequence, sensor 2 may receive diagnostic pulse 2002 and initiate its self-diagnostic tests. Any other sensors on the bus may continue to operate normally without initiating self-diagnostic tests because the diagnostic pulse only appeared in position 2 of the sequence.

As noted above, performing self-diagnostic tests may require extra time. Thus, sensor 2 will not respond immediately to controller 20 by sending its self-diagnostic test results. Rather, sensor 2 may respond with its test results after the sequence restarts. Note that in this example, there are four sensors operating on the bus. Therefore, after four trigger pulses, the sequence will restart. Thus, while sensor 2 is performing self-diagnostic tests, controller 20 may continue to transmit trigger pulses (e.g. trigger pulses 2008 in position 3 of the sequence, 2010 in position 4 of the sequence) and receive data from the sensors.

The next trigger pulse 2012 is in position 1 and restarts the transmission sequence. Thus, sensor 1 responds to trigger pulse 2012 by sending data 2018. The next trigger pulse 2020 instructs sensor 2 to send its data. Because sensor 2 initiated self-diagnostic tests in response to diagnostic pulse 2002 in the previous sequence, sensor 2 may respond to trigger pulse 2020 by sending data 2022, which may include results from sensor 2's self-diagnostic tests.

In other embodiments, a diagnostic pulse 2002 in the middle of the transmission sequence may cause all sensors on the bus to initiate self-diagnostic tests.

Figure 21:
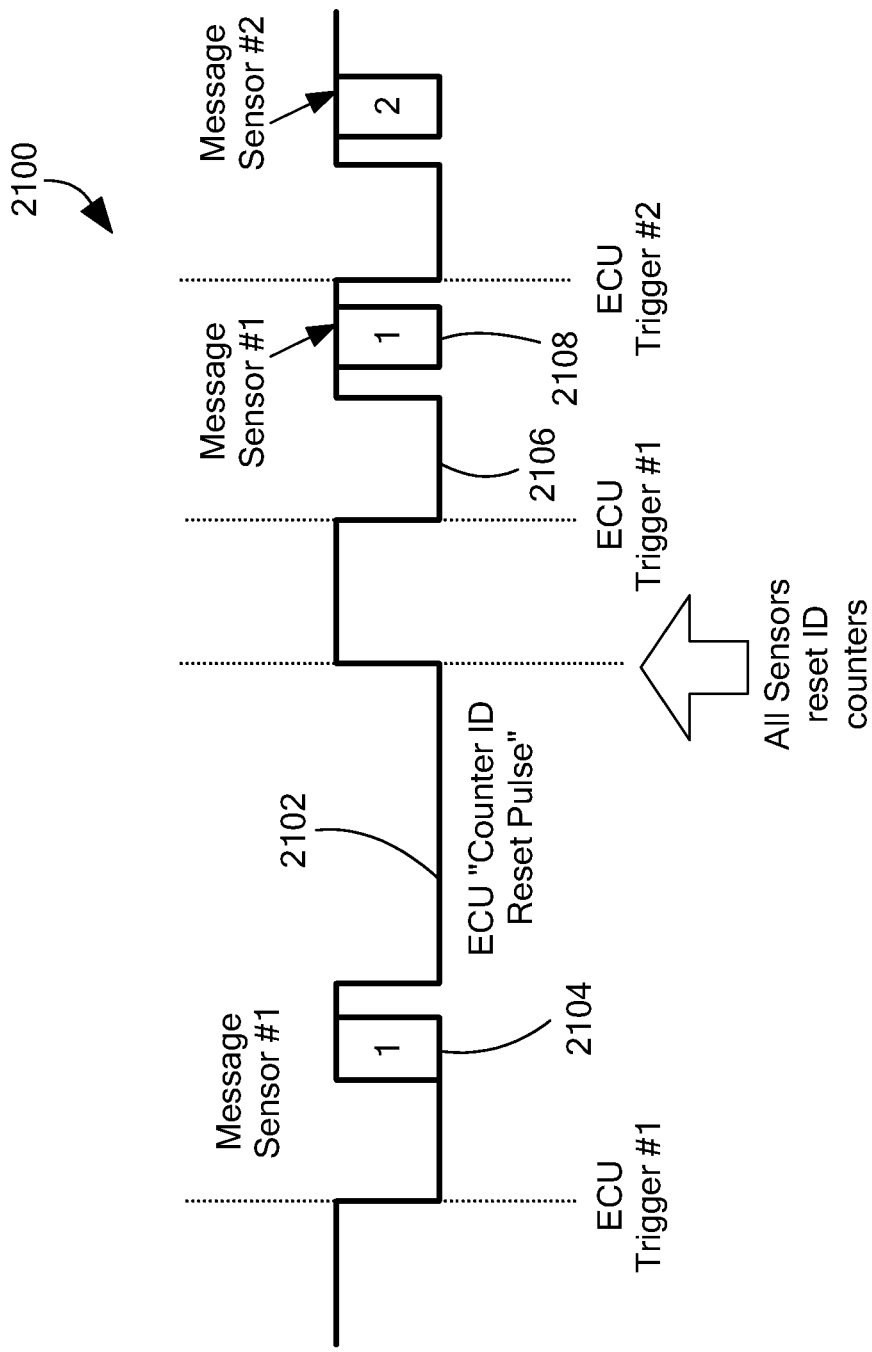
FIG. 21 is a timing diagram of another transmission sequence, including a predetermined sequence of replies and a counter resent pulse/command, between a master and multiples slaves on a communication node.

Referring now to FIG. 21, controller 20 may send a counter reset pulse 2102 to the sensors by holding the bus low (or alternatively high) for a predetermined period of time. The duration of counter reset pulse 2102 may be different from that of the diagnostic pulses, trigger pulses, or other pulses described above so as to differentiate the counter reset pulse 2102 from the other types of pulses.

Counter reset pulse 2102 may act as a reset command and may be transmitted at any point in transmission sequence 2100. When received by the sensors, the sensors may reset their counters so that the transmission sequence 2100 may restart from the beginning As shown in FIG. 21, reset pulse 2102 is sent after sensor 1 has transmitted data 2104. Reset pulse 2102 then causes transmission sequence 2100 to restart so that the next trigger pulse 2106 is the first trigger pulse in the sequence, and the following data 2108 is again sent by sensor 1.

Having described various embodiments, which serve to illustrate various concepts, structures and techniques, which are the subject of this patent, it will now become apparent to those of ordinary skill in the art that other embodiments incorporating these concepts, structures and techniques may be used.

Accordingly, it is submitted that that scope of the patent should not be limited to the described embodiments but rather should be limited only by the spirit and scope of the following claims. Elements of different embodiments described herein may be combined to form other embodiments not specifically set forth above.

What is claimed is:

1. A network slave device comprising:
   a transceiver for communicating over a communication bus in accordance with a point-to-point unidirectional network protocol, wherein the point-to-point unidirectional network protocol is a single edge nibble transmission (SENT) protocol;
   an address of the network slave device to identify the network slave device; and
   a communication circuit configured to process a command received by the transceiver and generate a reply for transmission over the communication bus if an address included in the command matches the address of the network slave device, wherein the network slave device comprises a magnetic field sensor.

2. The network slave device of claim 1 further comprising a memory, wherein the address of the network slave device is stored in the memory.

3. The network slave device of claim 1 wherein the communication circuit is configured to generate the reply if a number of transitions in a series of pulses on the communication bus corresponds to the address of the network slave device.

4. The network slave device of claim 1 wherein the magnetic field sensor comprises magnetic field sensing elements.

5. The network slave device of claim 4 wherein the magnetic field sensing elements Hall effect elements.

6. The network slave device of claim 4 wherein the magnetic field sensing elements comprise magnetoresistive elements.

7. The network slave device of claim 6 wherein the magnetoresistive elements comprise a giant magnetoresistance (GMR) element, a tunneling magnetoresistance (TMR) element, a magnetic tunnel junction (MTJ) element, a spin-valve, or a combination thereof.

8. The network slave device of claim 1 wherein the command comprises requests for data.

9. The network slave device of claim 8 wherein the requests for data comprise requests for data representing a magnetic field detected by the network slave device.

10. The network slave device of claim 1 wherein the communication circuit is configured to ignore commands if the address included in the command does not match the address of the network slave device.

11. The network slave device of claim 1 wherein the command includes one or more of: a sample command to perform a measurement; a data request command to transmit measurement data; a diagnostic command to perform a self-test; or a combination thereof.

12. The network slave device of claim 11 wherein the sample command comprises a pulse of a first predetermined length, the data request command comprises a pulse of a second predetermined length; and the diagnostic command comprises a pulse of a third predetermined length.

13. The network slave device of claim 1 wherein the command includes broadcast commands to all the slave devices coupled to the communication bus and the communication circuit is configured to process the broadcast commands.

14. The network slave device of claim 13 wherein the broadcast commands comprise commands that do not include the address.

15. The network slave device of claim 13 wherein the broadcast commands include one or more of: a sample command instructing all the respective network slave devices to perform one or more respective measurements; and a diagnostic command instructing all the respective network slave devices to perform one or more respective self-tests.

16. A system comprising:
   one or more slave devices coupled to a communication bus and each of the one or more slave devices having an address to identify the respective slave device and configured to communicate over the communication bus in accordance with a point-to-point unidirectional communication protocol, wherein the point-to-point unidirectional communication protocol is a single edge nibble transmission (SENT) protocol; and
   a master device configured to communicate over the communication bus in accordance with the point-to-point communication protocol and to send commands to a selected slave device of the one or more slave devices, the commands comprising the address of the selected slave device, wherein the one or more slave devices are magnetic field sensors.

17. The system of claim 16 wherein the address comprises a series of pulses to identify the selected slave device.

18. The system of claim 16 wherein the commands comprise requests for data.

19. The system of claim 18 wherein the requests for data include requests for data representing a magnetic field detected by at least one of the slave devices.

20. The system of claim 16 wherein each respective slave device of the one or more slave devices is configured to respond to commands comprising its respective address and ignore commands do not comprise its respective address.

21. The system of claim 16 wherein the commands include one or more of: a sample command instructing one of the slave devices to perform a measurement; a data request command instructing one of the slave devices to transmit measurement data; a diagnostic command instructing one of the slave devices to perform a self-test; or a combination thereof.

22. The system of claim 21 wherein the sample command comprises a pulse of a first predetermined length, the data request command comprises a pulse of a second predetermined length; and the diagnostic command comprises a pulse of a third predetermined length.

23. The system of claim 16 wherein the master device is further configured to send broadcast commands to all the slave devices coupled to the communication bus.

24. The system of claim 23 wherein the broadcast commands comprise commands that do not include the address.

25. The system of claim 23 wherein the broadcast commands include one or more of: a sample command instructing all the respective slave devices to perform one or more respective measurements; a diagnostic command instructing all the respective slave devices to perform one or more respective self-tests; or a combination thereof.

26. A method comprising:
communicating on a communication bus in accordance with a point-to-point unidirectional communication protocol by one or more slave devices each having a respective address and configured to respond to commands comprising the respective address, wherein the point-to-point unidirectional communication protocol is a single edge nibble transmission (SENT) protocol; and
sending, by a master device coupled to the communication bus, a command to the one or more slave devices, the command comprising a selected address of a selected slave device of the one or more slave devices, wherein the one or more slave devices are magnetic field sensors.

27. The method of claim 26 further comprising responding to the command by a slave device having an address that matches the selected address; and not responding to the command by slave devices having addresses that do not match the selected address.

28. The method of claim 26 wherein the commands comprise requests for data.

29. The method of claim 28 wherein the requests for data include requests for data representing a magnetic field detected by at least one of the slave devices.

30. The method of claim 26 wherein the commands include one or more of: a sample command to perform a measurement; a data request command to transmit measurement data; and a diagnostic command to perform a self-test.

31. The method of claim 26 wherein the sample command comprises a pulse of a first predetermined length; the data request command comprises a pulse of a second predetermined length; and the diagnostic command comprises a pulse of a third predetermined length.

32. The method of claim 26 further comprising sending, by the master device, a broadcast command to all the slave devices coupled to the communication bus.

33. The method of claim 32 wherein the broadcast command does not include an address.

34. The system of claim 32 wherein the broadcast command includes one or more of: a sample command instructing all the respective slave devices to perform one or more respective measurements; a diagnostic command instructing all the respective slave devices to perform one or more respective self-tests; or a combination thereof.

* * * * *

UNITED STATES PATENT AND TRADEMARK OFFICE
CERTIFICATE OF CORRECTION

PATENT NO. : 9,787,495 B2
APPLICATION NO. : 14/645957
DATED : October 10, 2017
INVENTOR(S) : Richard Vreeland et al.

It is certified that error appears in the above-identified patent and that said Letters Patent is hereby corrected as shown below:

In the Specification

Column 1, Line 55, delete "devices" and replace with --device--

Column 2, Line 39, delete "of transmission" and replace with --of another transmission--

Column 5, Line 65, delete "is" and replace with --are--

Column 6, Line 25, delete "of same" and replace with --of the same--

Column 6, Line 60, delete "of more" and replace with --or more--

Column 8, Line 21, delete "EEPROM 110" and replace with --EEPROM 100--

Column 9, Line 23, delete "(For" and replace with --(for--

Column 10, Line 42, delete "can used" and replace with --can be used--

Column 10, Line 53, delete "of second" and replace with --of a second--

Column 11, Line 47, delete "device the" and replace with --device, the--

Column 12, Line 23, delete "addressed sends" and replace with --addressed, it sends--

Column 12, Line 33, delete "bits bit" and replace with --bits--

Column 12, Line 56, delete "signal 400 that includes" and replace with --signal 400 includes--

Column 14, Line 33, delete "signal" and replace with --signals--

Signed and Sealed this
First Day of May, 2018

Andrei Iancu
*Director of the United States Patent and Trademark Office*

CERTIFICATE OF CORRECTION (continued)
U.S. Pat. No. 9,787,495 B2

Column 16, Line 50, delete "for time" and replace with --for a time--

Column 18, Line 26, delete "pulse they" and replace with --pulse, they--

Column 19, Line 22, delete "that that" and replace with --that the--

In the Claims

Column 19, Line 57, in Claim 5 delete "elements Hall" and replace with --elements comprise Hall--

Column 20, Line 60, in Claim 20 delete "commands do" and replace with --commands that do--